(12) United States Patent  
Kadota

(10) Patent No.: US 8,161,213 B2  
(45) Date of Patent: Apr. 17, 2012

(54) STORAGE MEDIUM

(75) Inventor: Masatoshi Kadota, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 455 days.

(21) Appl. No.: 12/032,034

(22) Filed: Feb. 15, 2008

(65) Prior Publication Data

US 2008/0244123 A1 Oct. 2, 2008

(30) Foreign Application Priority Data

Mar. 30, 2007 (JP) ................................ 2007-091916

(51) Int. Cl.
*G06F 13/12* (2006.01)
(52) U.S. Cl. ........................................... 710/74; 710/62
(58) Field of Classification Search ...................... 710/74
See application file for complete search history.

(56) References Cited

U.S. PATENT DOCUMENTS

| 2003/0212841 | A1* | 11/2003 | Lin ................................. 710/62 |
| 2004/0189808 | A1* | 9/2004 | Tanaka ........................ 348/207.1 |
| 2004/0252322 | A1* | 12/2004 | Gassho et al. .............. 358/1.14 |
| 2005/0190399 | A1 | 9/2005 | Nakaoka et al. |
| 2007/0104525 | A1* | 5/2007 | Isshiki ............................ 400/62 |
| 2007/0112997 | A1* | 5/2007 | Watanabe ..................... 710/313 |

FOREIGN PATENT DOCUMENTS

| JP | 4-77816 A | 3/1992 |
| JP | 2005-122224 A | 5/2005 |
| JP | 2005-138531 | 6/2005 |
| JP | 2005-216019 | 8/2005 |
| JP | 2005-219225 | 8/2005 |
| JP | 2007-128354 A | 5/2007 |

OTHER PUBLICATIONS

JP Office Action dtd Feb. 3, 2009, JP Appln. 2007-091916.

* cited by examiner

*Primary Examiner* — Henry Tsai
*Assistant Examiner* — John Roche
(74) *Attorney, Agent, or Firm* — Banner & Witcoff, Ltd.

(57) ABSTRACT

A storage medium connectable with an external device includes a data communication unit performing data communication with the external device, a data storing unit storing therein data received from and/or to be sent to the external device via the data communication unit, a first device information output unit sending first device information for making the external device recognize the storage medium as a storage to the external device via the data communication unit, and a second device information output unit sending second device information for making the external device recognize the storage medium as a printer to the external device via the data communication unit. When the data communication unit receives print data transmitted by the external device in cases where the second device information is sent, the data storing unit stores the print data in a state readable externally via the data communication unit.

15 Claims, 19 Drawing Sheets

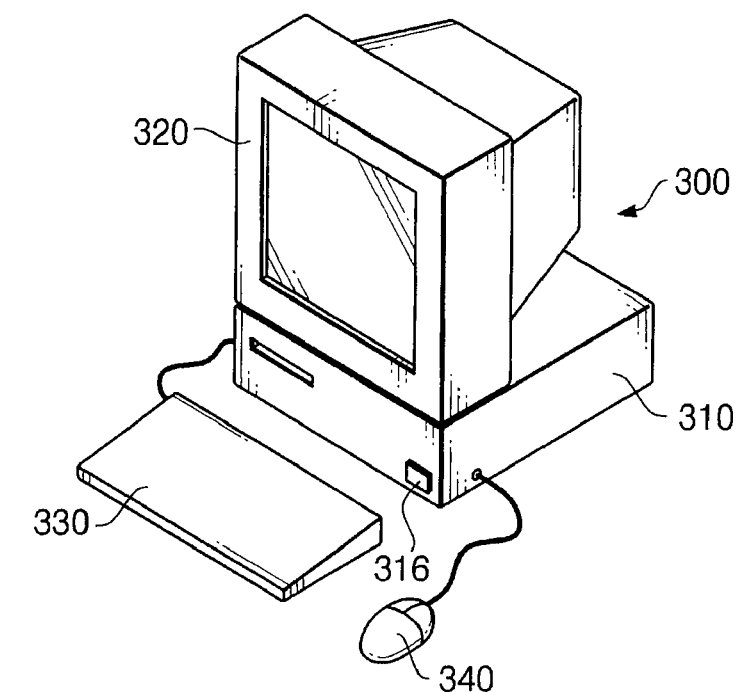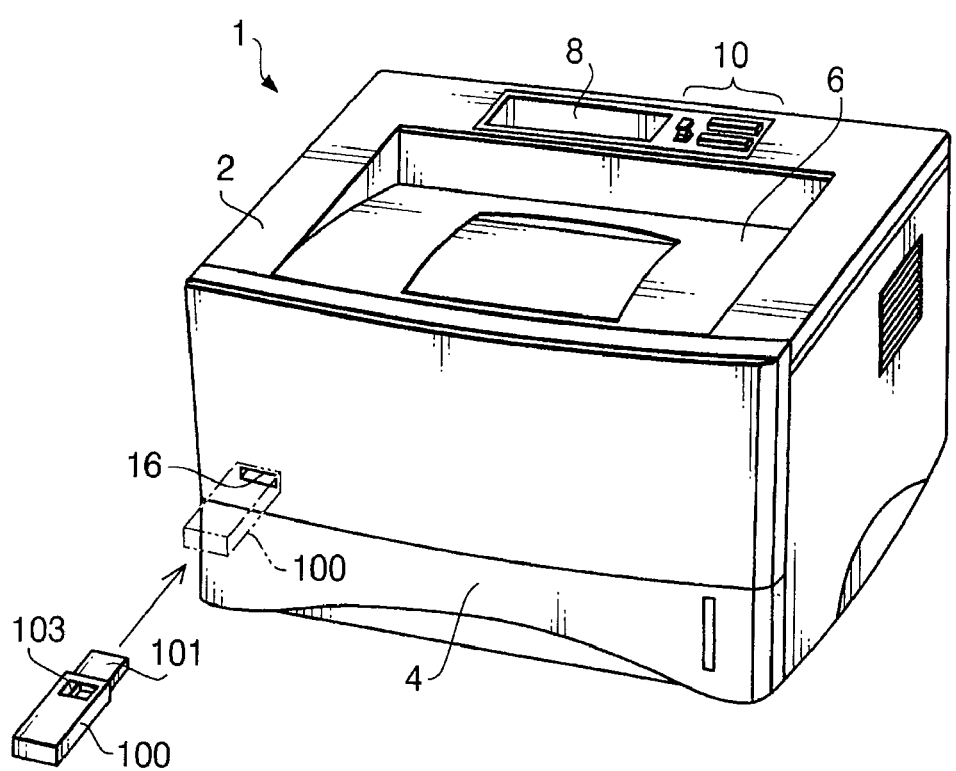
FIG. 1

| USB INPUT/OUTPUT | INTERFACE 1 | PRINTER CLASS | ENDPOINT 0 (CONTROL TRANSFER) |
| | | | ENDPOINT 1 (BULK OUT) |

| USB INPUT/OUTPUT | INTERFACE 1 | STORAGE CLASS | ENDPOINT 0 (CONTROL TRANSFER) |
| | | | ENDPOINT 1 (BULK OUT) |
| | | | ENDPOINT 2 (BULK IN) |

| USB INPUT/OUTPUT | | | ENDPOINT 0 (CONTROL TRANSFER) |
|---|---|---|---|
| | INTERFACE 1 | PRINTER CLASS | ENDPOINT 1 (BULK OUT) |
| | INTERFACE 2 | STORAGE CLASS | ENDPOINT 2 (BULK OUT) |
| | | | ENDPOINT 3 (BULK IN) |

| USB INPUT/OUTPUT | INTERFACE 1 | PRINTER CLASS | ENDPOINT 0 (CONTROL TRANSFER) |
| --- | --- | --- | --- |
| | | | ENDPOINT 1 (BULK OUT) |

FIG.13A

| USB INPUT/OUTPUT | INTERFACE 2 | STORAGE CLASS | ENDPOINT 0 (CONTROL TRANSFER) |
| --- | --- | --- | --- |
| | | | ENDPOINT 1 (BULK OUT) |
| | | | ENDPOINT 2 (BULK IN) |

FIG.13B

| USB INPUT/OUTPUT | INTERFACE 3 | STORAGE CLASS | ENDPOINT 0 (CONTROL TRANSFER) |
| --- | --- | --- | --- |
| | | | ENDPOINT 1 (BULK IN) |

FIG.13C

| USB<br>INPUT/OUTPUT | | | ENDPOINT 0 (CONTROL TRANSFER) |
| --- | --- | --- | --- |
| | INTERFACE 1 | PRINTER CLASS | ENDPOINT 1 (BULK OUT) |
| | INTERFACE 2 | STORAGE CLASS | ENDPOINT 2 (BULK OUT) |
| | | | ENDPOINT 3 (BULK IN) |
| | INTERFACE 3 | STORAGE CLASS | ENDPOINT 4 (BULK IN) |

| USB INPUT/OUTPUT | INTERFACE 1 | PRINTER CLASS | ENDPOINT 0 (CONTROL TRANSFER) |
| | | | ENDPOINT 1 (BULK OUT) |
| | | | ENDPOINT 2 (BULK IN) |

| USB INPUT/OUTPUT | INTERFACE 1 | STORAGE CLASS | ENDPOINT 0 (CONTROL TRANSFER) |
| | | | ENDPOINT 1 (BULK OUT) |
| | | | ENDPOINT 2 (BULK IN) |

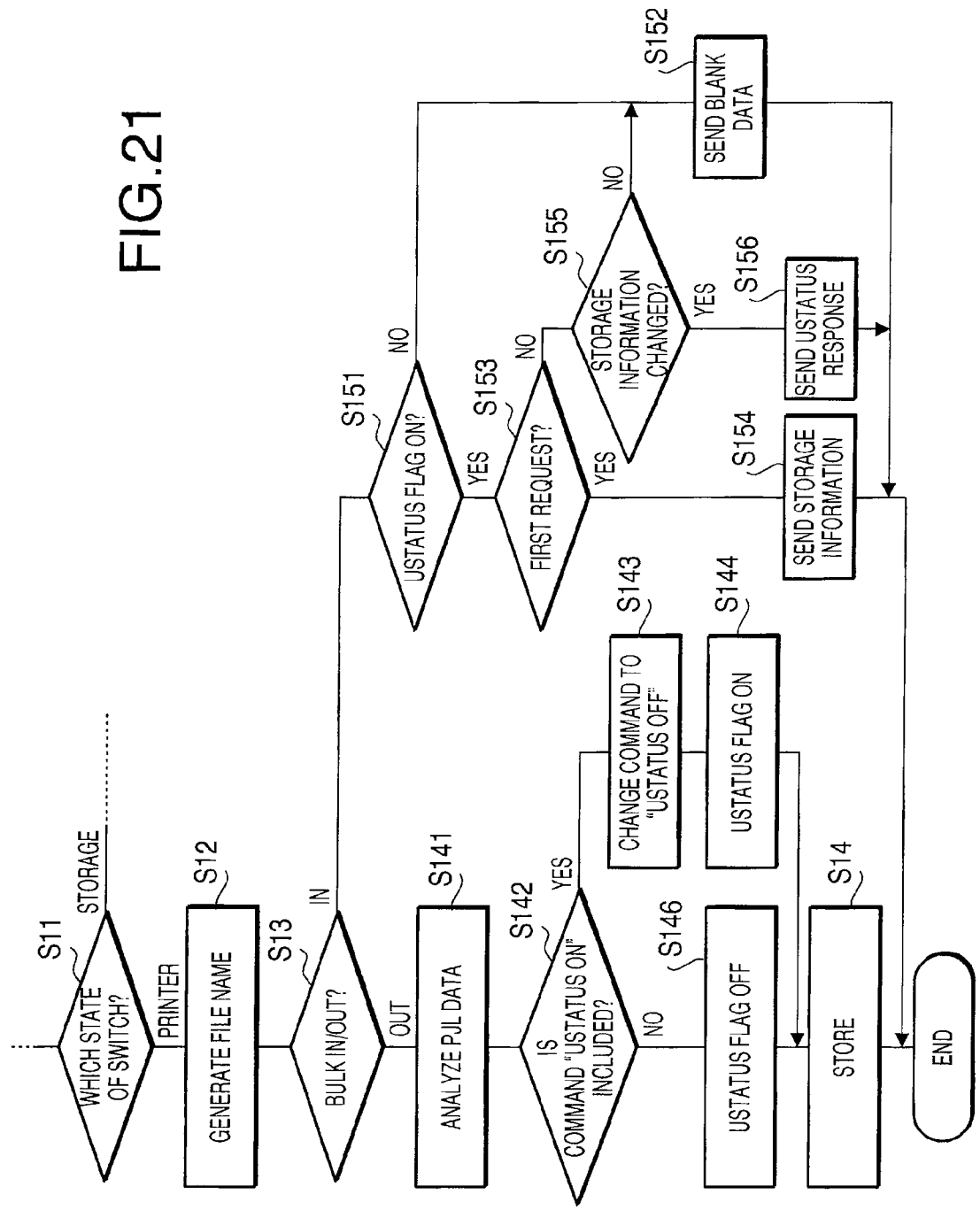

STORAGE MEDIUM

CROSS-REFERENCE TO RELATED APPLICATION

This application claims priority under 35 U.S.C. §119 from Japanese Patent Application No. 2007-091916 filed on Mar. 30, 2007. The entire subject matter of the application is incorporated herein by reference.

BACKGROUND

1. Technical Field

The following description relates to one or more storage media which are portable and capable of storing data therein, particularly to one or more storage media connectable with a general-purpose connecting port of a personal computer to which any of a printer and a storage medium can be connected.

2. Related Art

Conventionally, there has been known a personal computer provided with a connecting portion connectable with a USB memory as a general-purpose port to which any of a printer and a storage medium can be connected. Additionally, Japanese Patent Provisional Publication No. 2005-138531 (hereinafter, referred to as '531 publication) discloses that a printer provided with a connecting portion connectable with the USB memory can automatically read print data from the USB memory to perform a printing operation based on the print data, when the USB memory storing the print data is connected with the connecting portion. Generally, the above function of the printer is so called as "direct printing."

In order to perform the direct printing with the USB memory, it may be required to store print data generated by a printer driver into the USB memory, instead of storing a file generated by an application thereinto. In this regard, there has also been proposed a printer driver having a function of storing the print data generated by the printer driver into the USB memory. Specifically, the printer driver is provided with a check box "Output Print Data into File" such that the print data can be stored into the USB memory by checking the check box and then performing the printing operation.

SUMMARY

However, when the printer driver does not have the above function, the user is required to change a print port so as to store the print data into the USB memory. When an administrator is only authorized to change the print port, the user is compelled to perform cumbersome and complicated operations for changing the print port.

Aspects of the present invention are advantageous in that there can be provided one or more storage media that can make it easy to store print data generated by a printer driver thereinto and perform direct printing therewith.

According to aspects of the present invention, there is provided a storage medium connectable with an external device, which includes a data communication unit configured to perform data communication with the external device, a data storing unit configured to store therein data received from and/or to be sent to the external device via the data communication unit, a first device information output unit configured to send first device information for making the external device recognize the storage medium as a storage, to the external device via the data communication unit, and a second device information output unit configured to send second device information for making the external device recognize the storage medium as a printer, to the external device via the data communication unit. When the data communication unit receives print data for the printer that are transmitted by the external device in case where the second device information is sent by the second device information output unit, the data storing unit stores the print data in a state readable externally via the data communication unit.

According to the above configuration, the second device information output unit can send the second device information to the external device via the data communication unit, so as to make the external device recognize the storage medium as a printer. In this case, when the external device sends print data to the storage medium via the data communication unit in response to the second device information, the print data can be stored into the data storing unit, and further, externally be read out via the data communication unit.

Thus, according to the storage medium according to aspects of the present invention, the direct printing can easily be performed with the print data outputted by a printer driver of the external device being written into the storage medium without changing the print port. It is noted that the first device information and the second device information may be unified. In this case, the first device information output unit and the second device information output unit are configured as an integrated unit.

According to another aspect of the present invention, there is provided a storage medium connectable with an external device, which includes a data communication unit configured to perform data communication with the external device, a data storing unit configured to store therein data received from and/or to be sent to the external device via the data communication unit, and a device information output unit configured to send device information to the external device via the data communication unit, the device information including first device information for making the external device recognize the storage medium as a storage and second device information for making the external device recognize the storage medium as a printer. When the data communication unit receives print data for the printer that are transmitted by the external device in case where the device information is sent by the device information output unit, the data storing unit stores the print data in a state readable externally via the data communication unit.

According to the storage medium configured in this manner, the same effects as the aforementioned storage medium can be provided.

BRIEF DESCRIPTION OF THE ACCOMPANYING DRAWINGS

FIG. 1 is an external view schematically showing a configuration of an image forming system to which a USB memory is applied in accordance with one or more aspects of the present invention.

FIGS. 13A, 13B, and 13C show examples of assignment of endpoints in the USB memory in the fourth embodiment in accordance with one or more aspects of the present invention.

Figure 14:
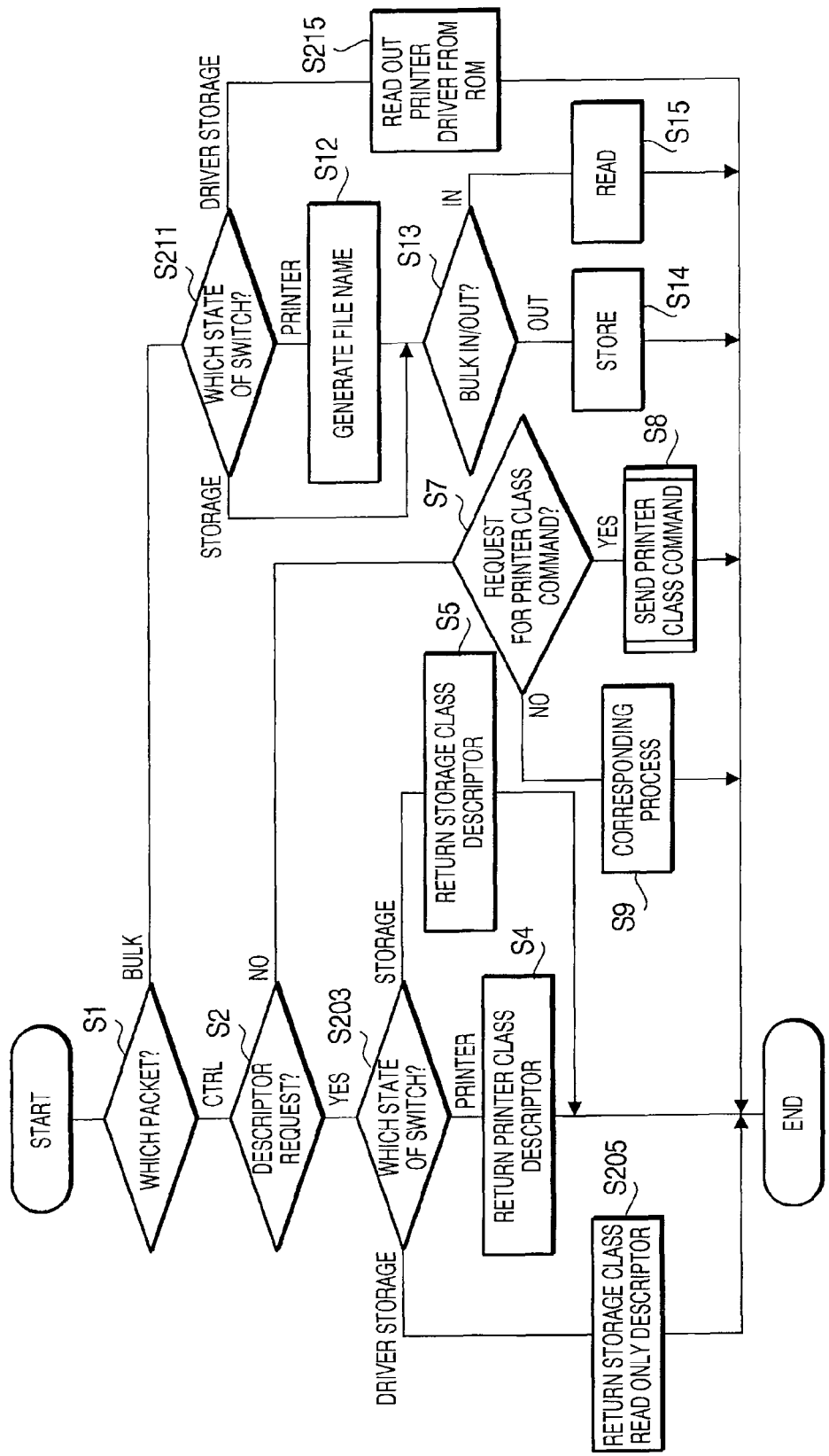

FIG. 14 is a flowchart illustrating a process to be executed in the USB memory in the fourth embodiment in accordance with one or more aspects of the present invention.

Figures 15, 16:
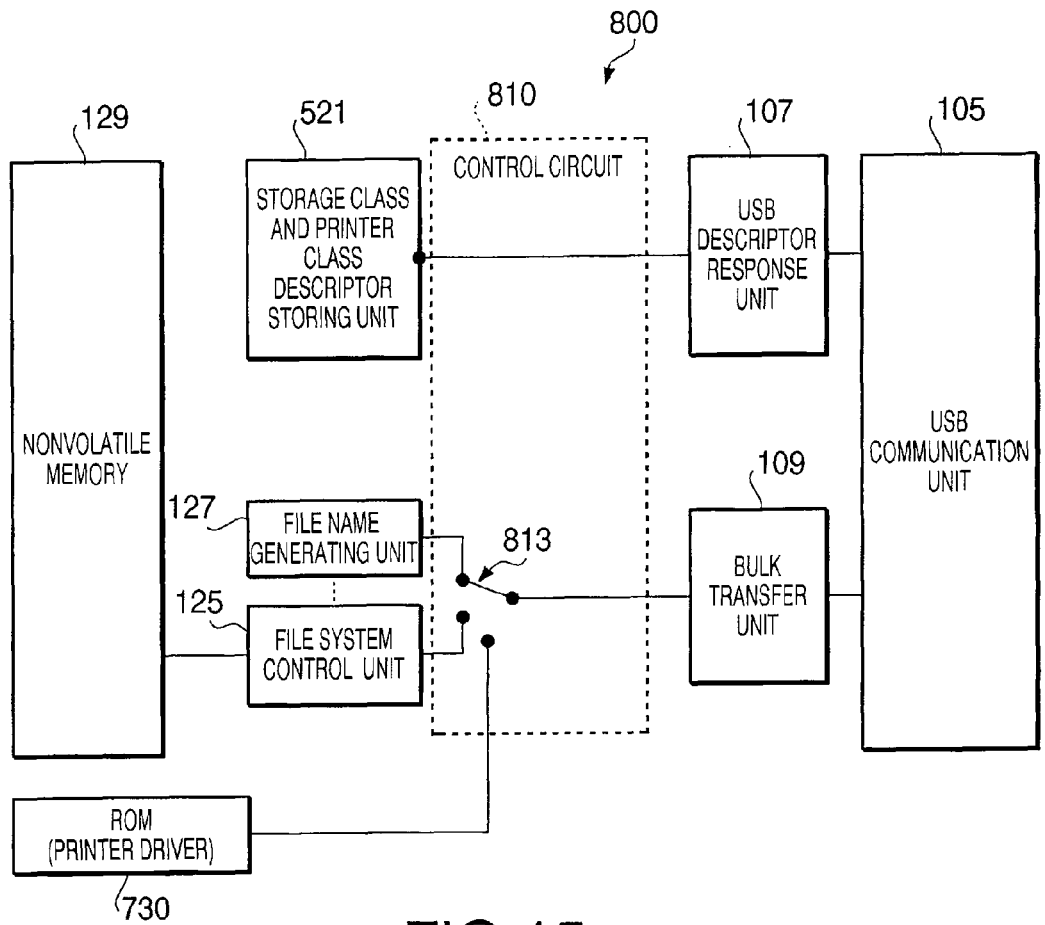

FIG. 15 is a schematic diagram showing a circuit configuration in a USB memory in a fifth embodiment in accordance with one or more aspects of the present invention.

FIG. 16 shows an example of assignment of endpoints in the USB memory in the fifth embodiment in accordance with one or more aspects of the present invention.

Figure 17:
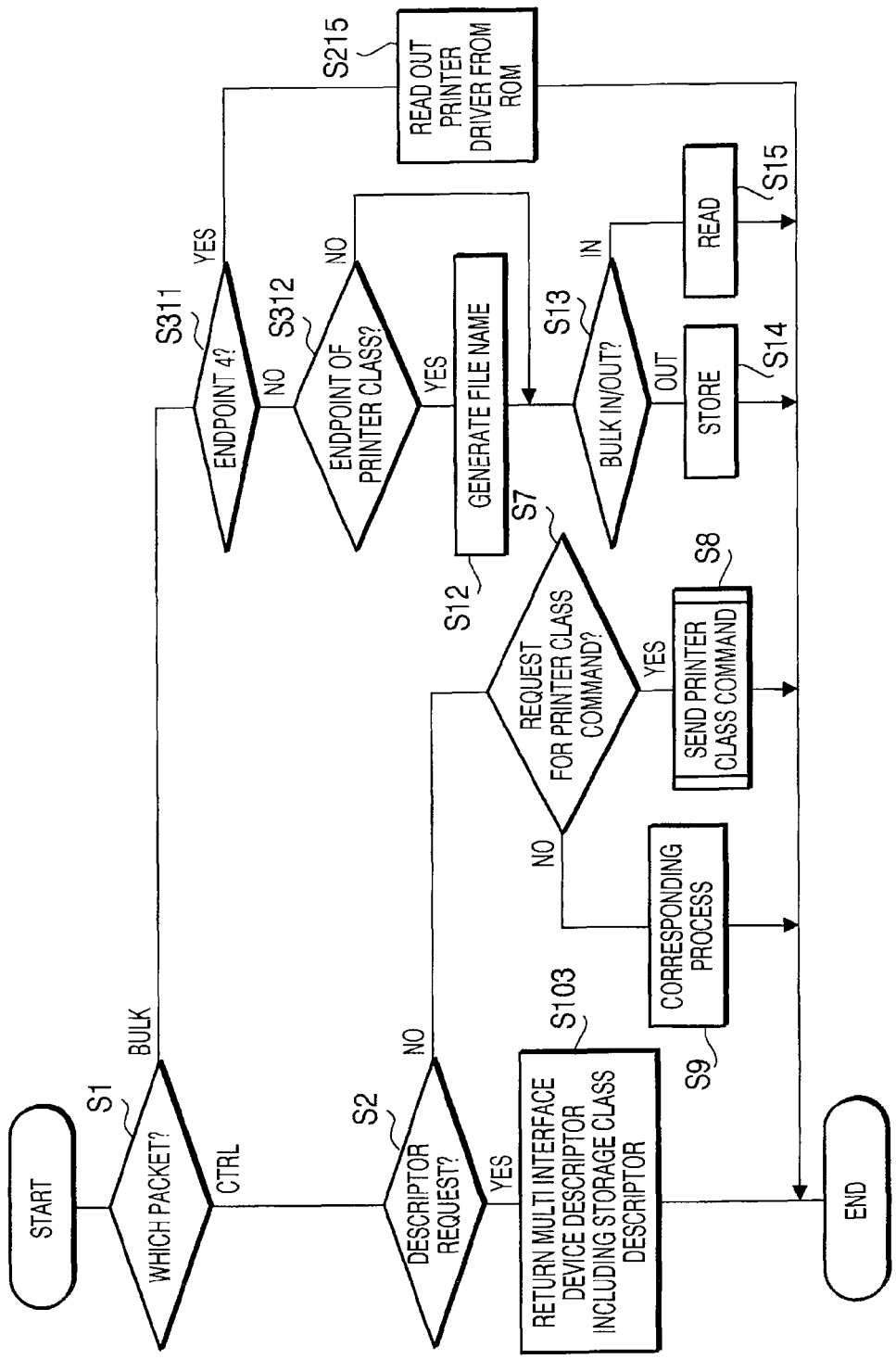

FIG. 17 is a flowchart illustrating a process to be executed in the USB memory in the fifth embodiment in accordance with one or more aspects of the present invention.

Figure 18:
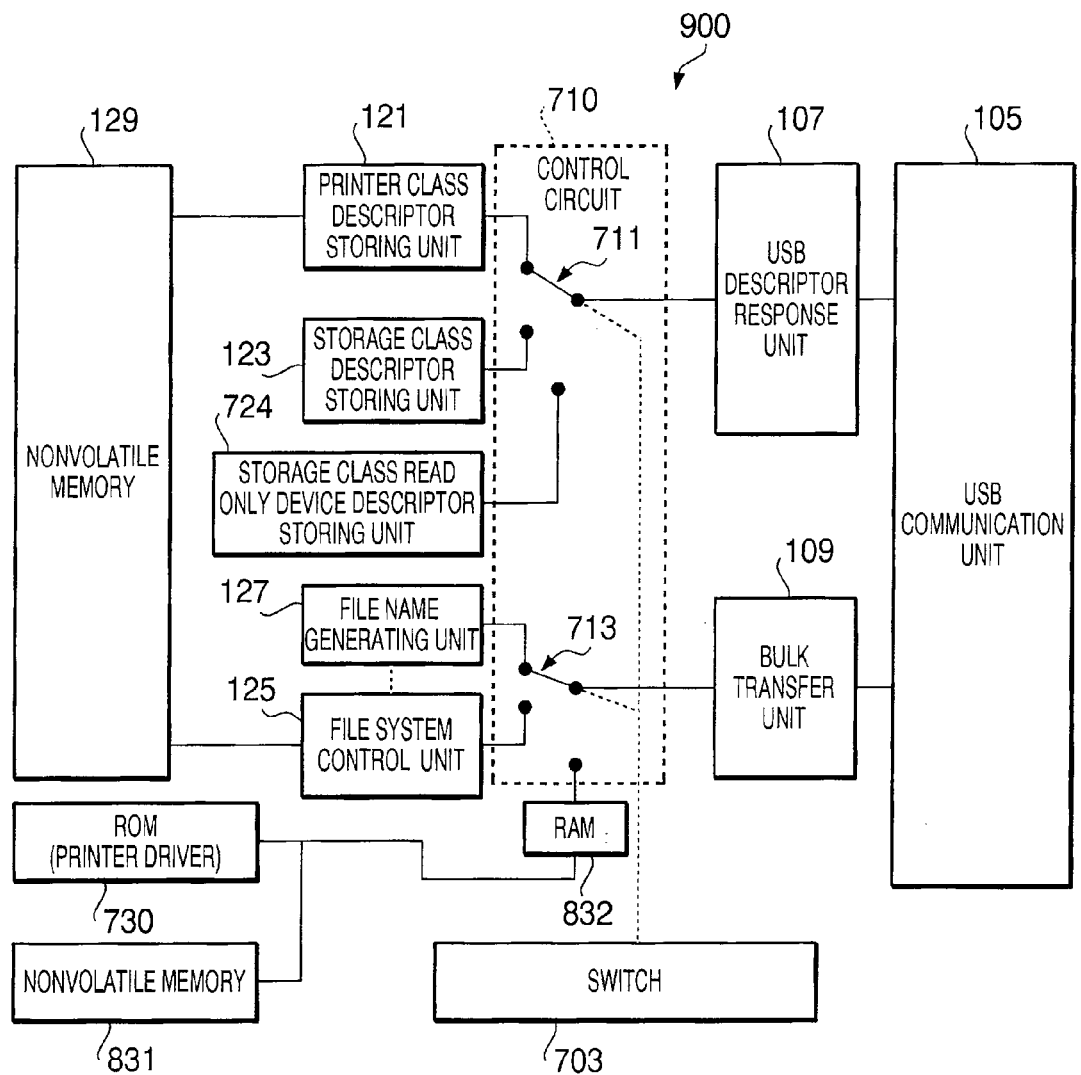

FIG. 18 is a schematic diagram showing a circuit configuration in a USB memory in a sixth embodiment in accordance with one or more aspects of the present invention.

Figures 19, 20A, 20B:
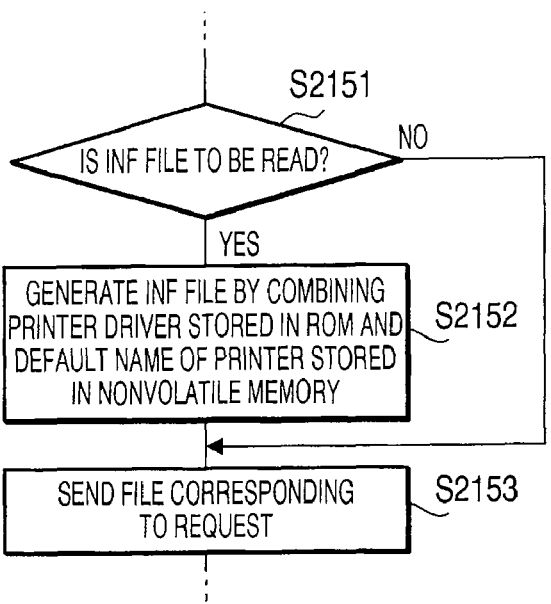

FIG. 19 is a flowchart illustrating a detailed process of a step S215 shown in FIG. 14 to be executed in the USB memory in the sixth embodiment in accordance with one or more aspects of the present invention.

FIGS. 20A and 20B show examples of assignment of endpoints in the USB memory in the sixth embodiment in accordance with one or more aspects of the present invention.

FIG. 21 is a flowchart illustrating a process executed in the USB memory in a modification in accordance with one or more aspects of the present invention.

Figure 22:
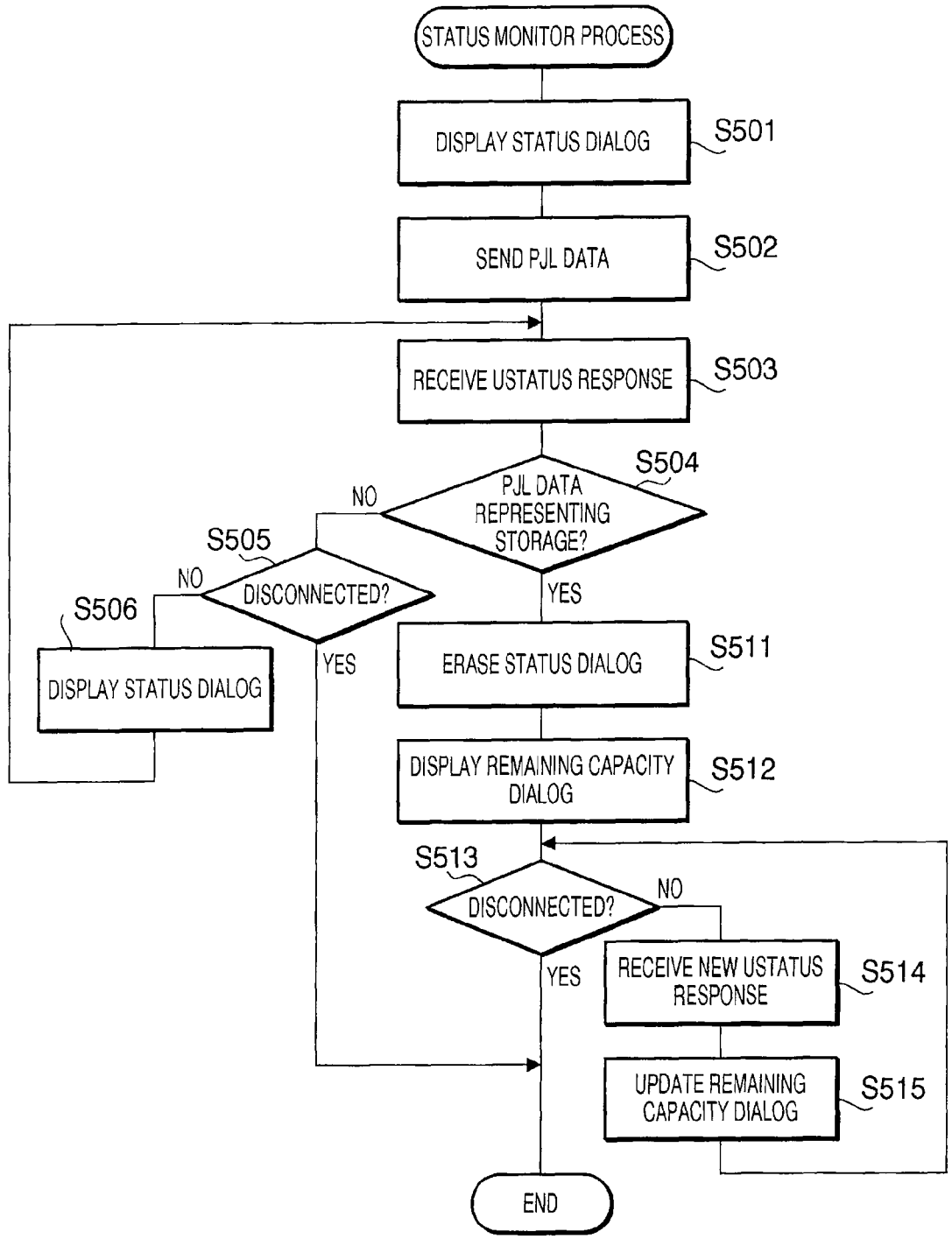

FIG. 22 is a flowchart illustrating a status monitor process to be executed by the PC corresponding to the process shown in FIG. 21 in the modification in accordance with one or more aspects of the present invention.

Figure 23A:
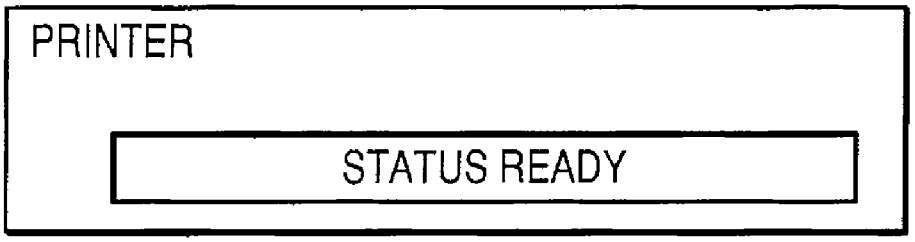
Figure 23B:
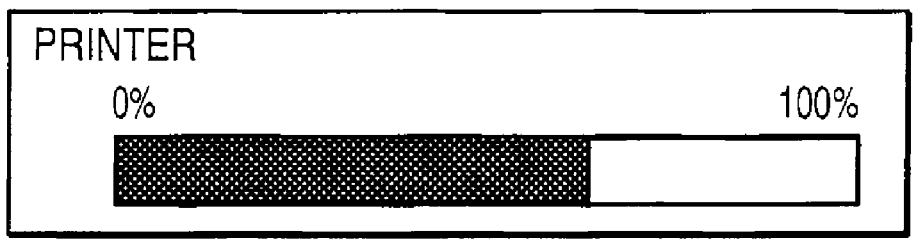

FIGS. 23A and 23B show examples of dialogues displayed in the status monitor process in the modification in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, embodiments according to aspects of the present invention will be described with reference to the accompanying drawings.

FIG. 1 is an external view schematically showing a configuration of an image forming system to which a USB memory 100 is applied as an example of a portable storage medium according to aspects of the invention. As shown in FIG. 1, the image forming system according to aspects of the invention includes a printer 1 and a personal computer (hereinafter simply referred to a "PC") 300.

The printer 1 is provided with a sheet feed cassette 4, accommodating recording sheets (not shown) therein, which is configured to be inserted in and ejected from a lower portion of a main body 2. Additionally, the printer 1 is provided with a tray unit 6 to which the printed recording sheet is discharged, a display unit 8 including an LCD display which displays various information thereon, and an operating unit 10 which accepts various kinds of input operations through various operation keys, at the upper side of the main body 2. The main body 2 is further provided with an insertion unit 16 to which the USB memory is detachably connected.

Figure 2:
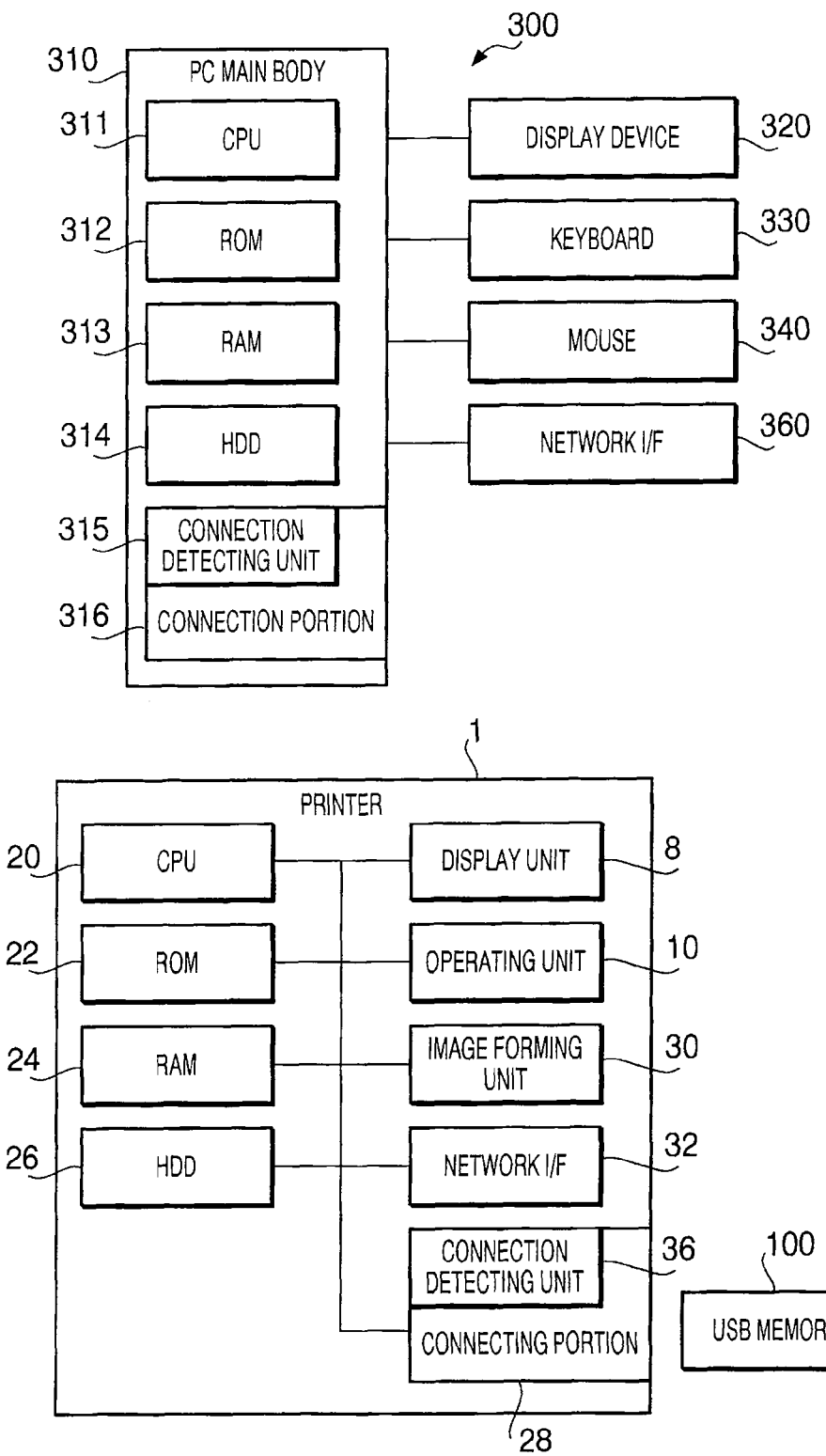
FIG. 2 is a block diagram showing a configuration of a control system of the image forming system in accordance with one or more aspects of the present invention.

FIG. 2 is a block diagram showing a configuration of a control system of the image forming system. As shown in FIG. 2, the printer 1 is provided with a CPU 20 for executing various processing programs, a ROM 22 for storing therein the various processing programs, a RAM 24 for temporally storing therein a processing result, an HDD (Hard Disk Drive) 26 for storing data therein, a connecting portion 28 with which the USB memory 100 is connected, the aforementioned display unit 8, and the operation unit 10. The printer 1 is further provided with an image forming unit 30 which prints an image on the recording sheet based on control by the processing program, and a network I/F (interface) 32 through which the printer 1 is connected to a network such as a LAN and Internet (not shown). The connecting portion 28 is provided with a well known connection detecting unit 36 which detects a connection status of the USB memory 100 by monitoring a signal level of a terminal of the connecting portion 28. Specifically, when the USB memory is connected to the connecting portion 28, the signal level of the terminal is in a conduction state. On the other hand, when the USB memory is not connected to the connecting portion 28, the signal level of the terminal is in a non-conduction state.

The image forming unit 30 is configured to form a latent image on a photoconductive drum by scanning the drum with laser light modulated in accordance with image data, develop the latent image to form a toner image, print the toner image on a recording sheet fed from the sheet feed cassette 4, and discharge the recording sheet to the tray unit 6 after the toner image is firmly fixed on the recording sheet. While a page printer is used in the present embodiment as described above, an inkjet type serial printer may be applied to the embodiment.

Additionally, the printer 1 is configured to create image data by developing print data stored in the USB memory 100 in a frame memory of the RAM 24. The image data developed in the frame memory of the RAM 24 is sent to the image forming unit 30 as CMYK data (or K data in case of grayscale) and printed on the recording sheet as described above. Incidentally, the printing may be made in a color mode or monochrome mode.

A main body 310 of the PC 300 is provided with a CPU 311, a ROM 312, a RAM 313, an HDD (Hard Disk Device)

314 and a connecting portion 316 with which the USB memory 100 is connected. The connecting portion 316 of the PC 300 is also provided with a connection detecting unit 317 which detects a connection status of the USB memory 100 by monitoring a signal level of a terminal of the connecting portion 316. Additionally, the main body 310 is provided with a well known display device 320, a keyboard 330, a mouse 340 and a network I/F (interface) 360 through which the PC 300 is connected with a network such as the LAN and Internet (not shown). Incidentally, the connecting portion 316 of the PC 300 is a commonly used port connectable with the printer 1 via a USB cable.

The USB memory 100 in the present embodiment is provided with a widely-known connecting portion 101 connectable with the connecting portions 28 and 316, and a switch 103 switchable between two positions by a user manual operation.

Figures 3, 4A, 4B:
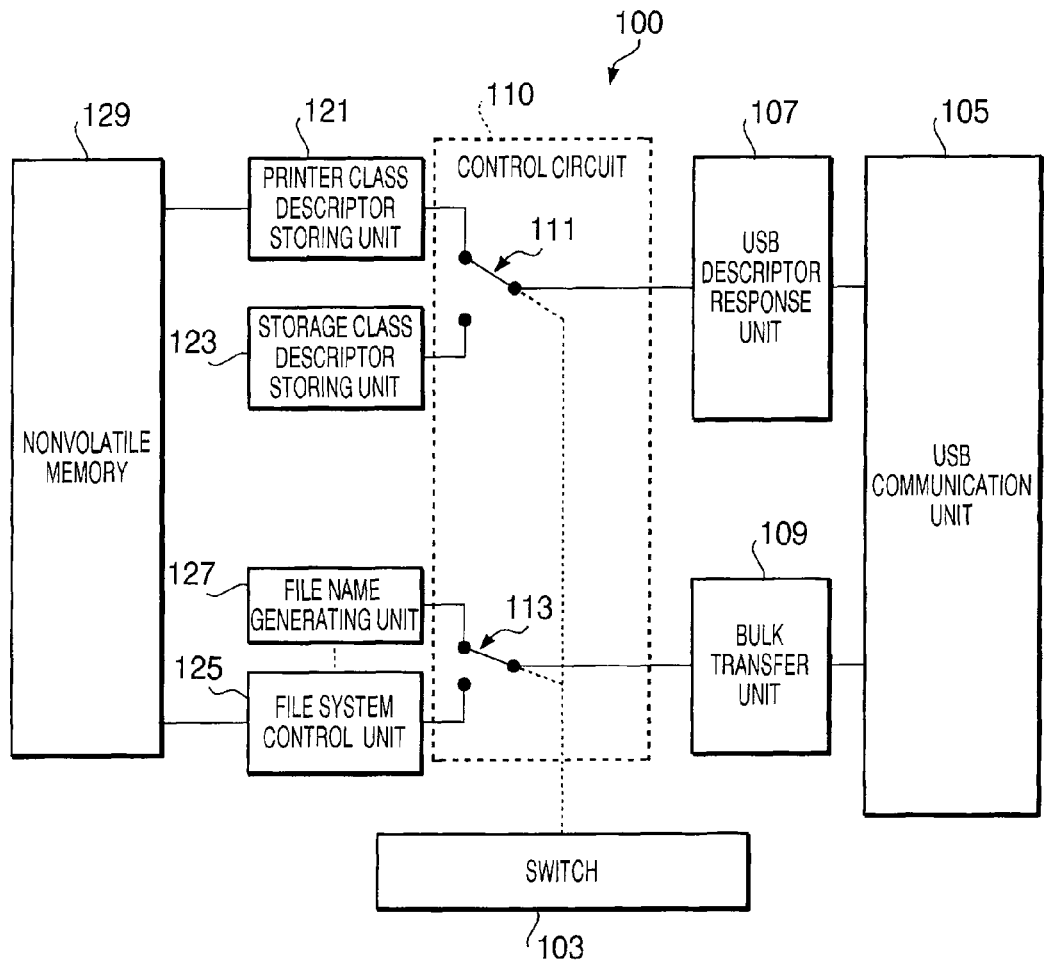
FIG. 3 is a schematic diagram showing a circuit configuration in the USB memory in a first embodiment in accordance with one or more aspects of the present invention.
FIGS. 4A and 4B show examples of assignment of endpoints in the USB memory in the first embodiment in accordance with one or more aspects of the present invention.

FIG. 3 schematically shows a circuit configuration in the USB memory 100 in a first embodiment according to aspects of the invention. As shown in FIG. 3, the USB memory 100 is provided with a USB communication unit 105 capable of transmitting/receiving data via the connecting portion 101. The USB communication unit 105 is connected to a USB descriptor response unit 107 and a bulk transfer unit 109.

The USB descriptor response unit 107 is selectively connected to a printer class descriptor storing unit 121 or a storage class descriptor storing unit 123 via a contact point 111 provided in a control circuit 110. The bulk transfer unit 109 is also selectively connected directly to a file system control unit 125 or indirectly thereto via a file name generating unit 127 by switching a contact point 113 of the control circuit 110. The control circuit 110 is configured with a logic circuit to switch the contact points 111 and 113 in accordance with a state of the switch 103.

The printer class descriptor storing unit 121 is a circuit storing a descriptor of a printer class and connected to a nonvolatile memory 129. The nonvolatile memory 129 stores an indefinite part of the printer class descriptor, such as a name or a product ID of a printer to be pretended. The printer class descriptor storing unit 121 generates a pseudo printer class descriptor by combining a definite part of the printer class descriptor stored in the printer class descriptor storing unit 121 and the indefinite part stored in the nonvolatile memory 129 that varies depending on the printer to be pretended. The storage class descriptor storing unit 123 stores a descriptor of a storage class. Further, the file system control unit 125 is a circuit configured to control a file system for data written in or read from the nonvolatile memory 129.

In the USB memory 100 configured as above, endpoints are assigned as shown in FIGS. 4A and 4B depending on a state of the switch 103. Specifically, when the switch 103 is set to a printer side, "control transfer" and "bulk out" of the printer class of an interface 1 are assigned to "endpoint 0" and "endpoint 1", respectively, as shown in FIG. 4A. On the other hand, when the switch 103 is set to a storage side, "control transfer", "bulk out" of the storage class of the interface 1 and "bulk in" of the storage class of the interface 1 are assigned to "endpoint 0", "endpoint 1" and "endpoint 2", respectively, as shown in FIG. 4B.

Next, a process to be executed by a logic circuit including the control circuit 110 of the USB memory 100 in the first embodiment will be described. It is noted that although the processes described below are actually executed by hardware (i.e. the logic circuit of the USB memory 100), the following explanation will be given with a flowchart representing an equivalent process for the sake of convenience. It is expressly understood that the USB memory may incorporate a CPU therein so as to execute the process by running software with the CPU.

Figure 5:
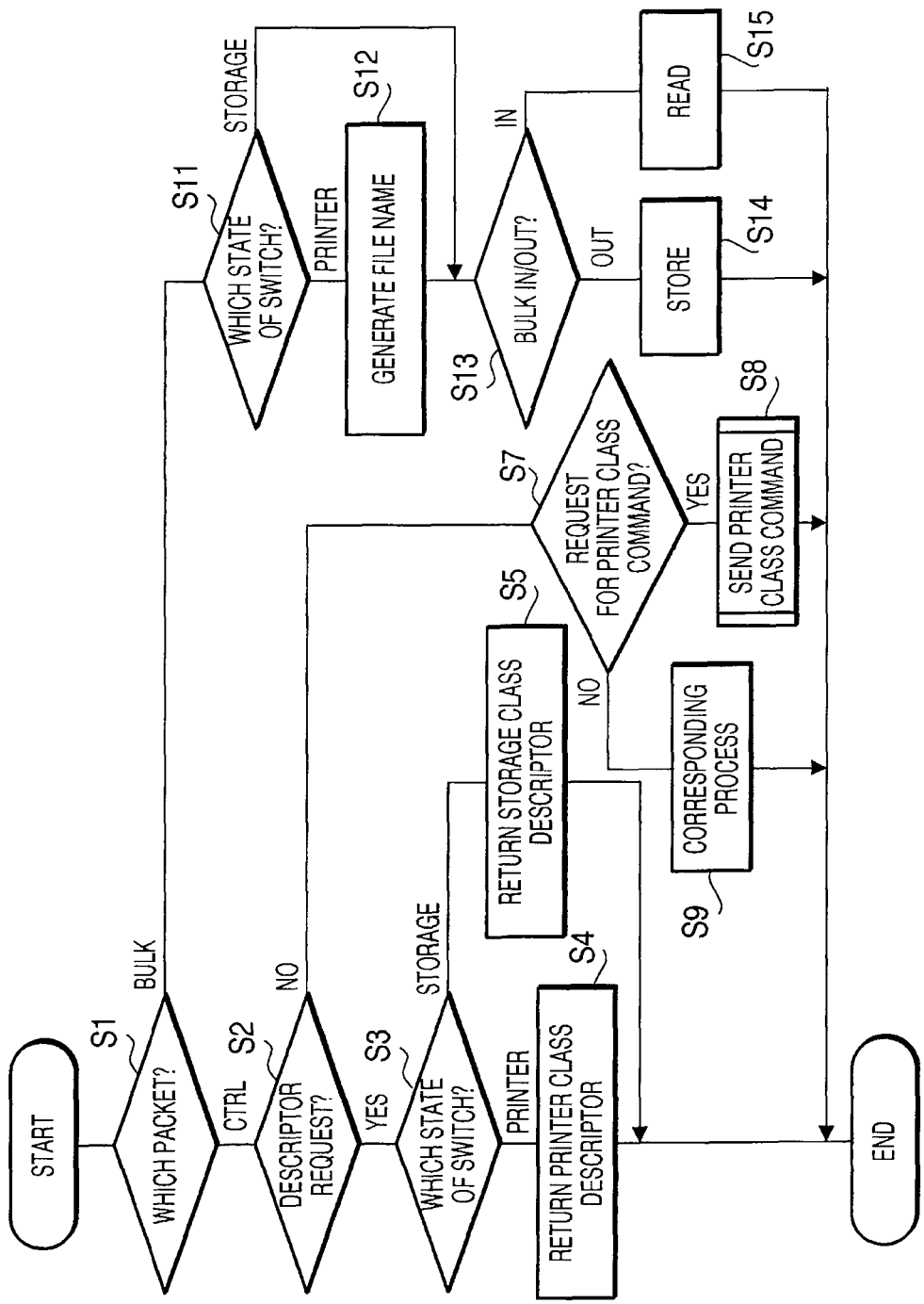
FIG. 5 is a flowchart illustrating a process to be executed in the USB memory in the first embodiment in accordance with one or more aspects of the present invention.

When the USB memory 100 is connected to the connecting portion 316 of the PC 300, the CPU 311 transmits a packet for requesting various information to the USB memory 100. FIG. 5 is a flowchart illustrating the process to be executed in the USB memory 100 when receiving the packet.

As shown in FIG. 5, it is firstly judged whether the received packet is a packet for control transfer or a packet for bulk transfer (S1). Normally, when the connection detecting unit 317 of the PC 300 detects that the USB memory 100 is connected to the connecting portion 316, the PC 300 transmits the packet for control transfer for requesting the USB memory to return a descriptor in order to specify what device is connected to the connecting portion 316.

When the received packet is a packet for control transfer (S1: CTRL), it is judged whether the packet includes a descriptor request (S2). When the packet includes the descriptor request (S2: YES), it is further judged in which state the switch 103 is set (S3). When the switch 103 is set to the printer side (S3: Printer), a printer class descriptor stored in the printer class descriptor storing unit 121 is transmitted to the PC 300 (S4) and the process is terminated. At this time, the contact point 111 is connected to the printer class descriptor storing unit 121 (see FIG. 3).

On the other hand, when the switch 103 is set to the storage side (S3: Storage), a storage class descriptor stored in the storage class descriptor storing unit 123 is transmitted to the PC 300 (S5), and the process is terminated. At this time, the contact point 111 is connected to the storage 121 (see FIG. 3).

As described above, the printer class descriptor is transmitted to the PC 300 via the connecting portions 101 and 316 by setting the switch 103 at the printer side, thereby making the PC 300 recognize the USB memory 100 as a printer. In the case where the PC 300 recognizes the USB memory 100 as the printer, print data generated by a printer driver of the PC 300 can be outputted to the USB memory 100 in the same manner as outputted to the printer 1. Then the print data outputted by the printer driver of the PC 300 can be stored in the nonvolatile memory 129 of the USB memory 100, as described later.

Specifically, when Windows XP (trademark registered) is used as an OS (Operating System) in the PC 300, a port to be assigned to the USB memory 100 is generated by plug and play, which port is equivalent to a normal USB printer port (such as USB001) generated when the printer is connected to the PC 300. Therefore, a user can output print data to the USB memory by a normal printing operation, without caring which device (a printer or a USB memory) is connected to the PC.

Additionally, the storage class descriptor is transmitted to the PC 300 via the connecting portions 101 and 316 by setting the switch 103 at the storage side, thereby making the PC 300 recognize the USB memory 100 as a storage device.

Meanwhile, when the packet for control transfer does not include the descriptor request (S2: NO), it is judged whether the packet includes a request for a printer class command (S7). When the packet includes the request for the printer class command (S7: YES), the printer class command is transmitted to the PC 300 in response to the request (S8), and the process is terminated. On the other hand, when the packet does not include the request for the printer class command (S7: NO), a process corresponding to the packet is performed (S9) and the process is terminated.

Figure 6:
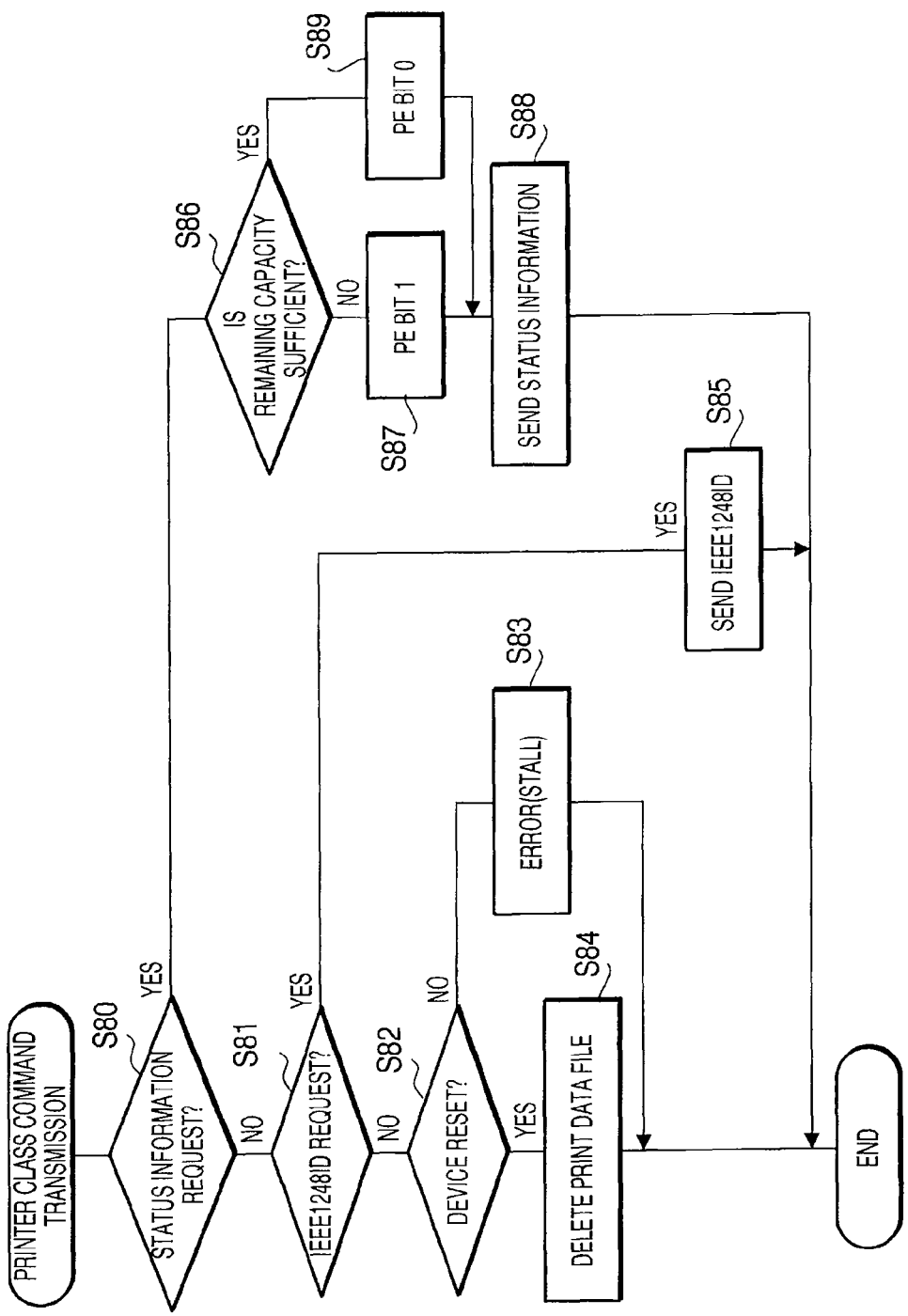
FIG. 6 is a flowchart illustrating a printer class command transmitting process in a step S8 shown in FIG. 5 in the first embodiment in accordance with one or more aspects of the present invention.

FIG. 6 is a flowchart illustrating a printer class command transmitting process in S8 of FIG. 5. Firstly, it is judged whether the packet includes a status information request (S80). When the packet does not include the status information request (S80: NO), it is judged whether the packet includes an IEEE1248ID request (S81). When the packet does not include the IEEE1248ID request (S81: NO), it is further judged whether the packet includes a device reset as an example of a reset signal (S82).

When the packet does not include the device reset (S82: NO), it is judged that an error (stall) is caused (S83) and the process is terminated.

On the other hand, when the packet includes the device reset (S82: YES), data stored in the nonvolatile memory 129, such as print data, are deleted (S84) and the process is terminated. When the packet includes the IEEE1248ID request (S81: YES), the IEEE1248IID is transmitted to the PC 300 (S85) and the process is terminated. Incidentally, when the USB memory 100 is supplied with the printer 1 as an attachment of the printer 1, the IEEE1248ID of the printer 1, which is previously stored in the USB memory 100, is transmitted to the PC 300 in S85.

When the packet includes the status information request (S80: YES), it is judged whether the nonvolatile memory 129 is available, that is, whether there is a sufficient remaining capacity in the nonvolatile memory 129 (S86). When the nonvolatile memory 129 is not available (S86: NO), a PE bit is set to "1" (S87). On the other hand, when the nonvolatile memory 129 is available (S86: YES), the PE bit is set to "0" (S89). The PE bit is a bit representing a paper error status. Specifically, the PE bit with the status "1" represents that an error of "out of paper" is caused. In a subsequent step S88, status information including the status of the PE bit is transmitted to the PC 300, and the printer class command transmitting process is terminated.

With the printer class command transmitting process as described above, when the nonvolatile memory 129 is not available, that is, the nonvolatile memory 129 does not have a sufficient remaining capacity, the status information including the status "1" of the PE bit is transmitted to the PC 300 (S87 and S88). Then, when the status information is received, the PC 300 displays a paper error message on the display device 320 and automatically interrupts transmitting print data to the USB memory 100 with a print system of the OS. According to the error message on the display device 320, the user is informed that the USB memory 100 is not available and the print data are not completely stored in the USB memory 100. Then, the user can perform necessary operations such as operations of deleting unnecessary data from the USB memory 100 and retrying the print operation.

Referring back to FIG. 5, when the received packet is for bulk transfer (S1: Bulk), it is judged in which state the switch 103 is set in the same manner as the step S3 (S11). When the switch 103 is set to the printer side (S11: Printer), a unique file name is given for subject data by the file name generating unit 127 in an already known manner (S12) and the process goes to S13. On the other hand, when the switch 103 is set to the storage side (S11: Storage), the process goes to S13 without performing the step S12. Specifically, when the switch 103 is set to the printer side, the contact point 113 is connected to the file name generating unit 127 and the unique file name is automatically generated. On the other hand, when the switch 103 is set to the storage side, the contact point 113 is connected to the file system control unit 125 (see FIG. 3). Hence, the USB memory 100 is accessed with a file name given by the user in the same fashion as a normal storage.

Subsequently, it is judged whether the received packet is for bulk in transfer or bulk out transfer (S13). When the packet is for bulk out transfer (S13: Out), data transmitted from the PC 300 are stored in the nonvolatile memory 129 (S14) and the process is terminated. On the other hand, when the packet is for bulk in transfer (S13: In), data stored in the nonvolatile memory 129 are read out (S15), and the process is terminated.

Incidentally, the storing in S14 and reading out in S15 are performed via the file system control unit 125. Since a file of the print data transmitted to the USB memory 100 which is recognized as a printer by the PC 300 has no file name (S11: Printer), the unique file name is generated (S12) and stored in the nonvolatile memory 129 via the file system control unit 125 (S14) in the above process. Additionally, when the print data are transmitted to the USB memory 100 recognized as the printer, it cannot be judged when the print job is to be terminated. Therefore, the file of the print data is closed when the USB memory 100 is disconnected from the PC 300. In other words, when the printing operation is performed in the state where the USB memory 100 is connected to the PC 300, the whole print job during the printing operation is stored in one file.

As described above, by setting the switch 103 to the storage side (S3: Storage), the storage class descriptor is transmitted to the PC 300 (S5), thereby making the PC 300 recognize the USB memory 100 as a storage. In this case, data can be stored into (S14) and read out (S15) from the USB memory 100 in the same way as a general USB memory.

On the other hand, by setting the switch 103 to the printer side (S3: Printer), the printer class descriptor is transmitted to the PC 300 (S4), thereby making the PC 300 recognize the USB memory 100 as a printer. In this case, the print data can be transmitted to the USB memory 100 with bulk transfer by the printer driver of the PC 300 in the same way as outputted to the printer 1, and stored in the nonvolatile memory 129 of the USB memory 100 (S14).

Then the print data stored in the nonvolatile memory 129 can automatically be read out and printed by the printer 1 (direct printing) by connecting the USB memory 100 to the connecting portion 28 of the printer 1, with the switch 103 being set to the storage side. Consequently, the USB memory 100 in the above embodiment can be applied to write thereinto the print data outputted by the printer driver of the PC 300 and perform the direct printing based on the written data, without changing a port.

Additionally, if the print data are stored in the nonvolatile memory 129 of the USB memory 100, when the device reset request is transmitted from the PC 300 (S82: YES), the print data stored in the nonvolatile memory 129 are deleted (S84). Further, when the nonvolatile memory 129 does not have a sufficient remaining capacity (S86: YES), the status information including the PE bit of "1" is transmitted to the PC 300 (S88). Therefore, according to the above embodiment, an operation of outputting the print data to the USB memory 100 is substantially the same for the PC 300 as an operation of outputting the print data to the printer 1.

Figures 7, 8:
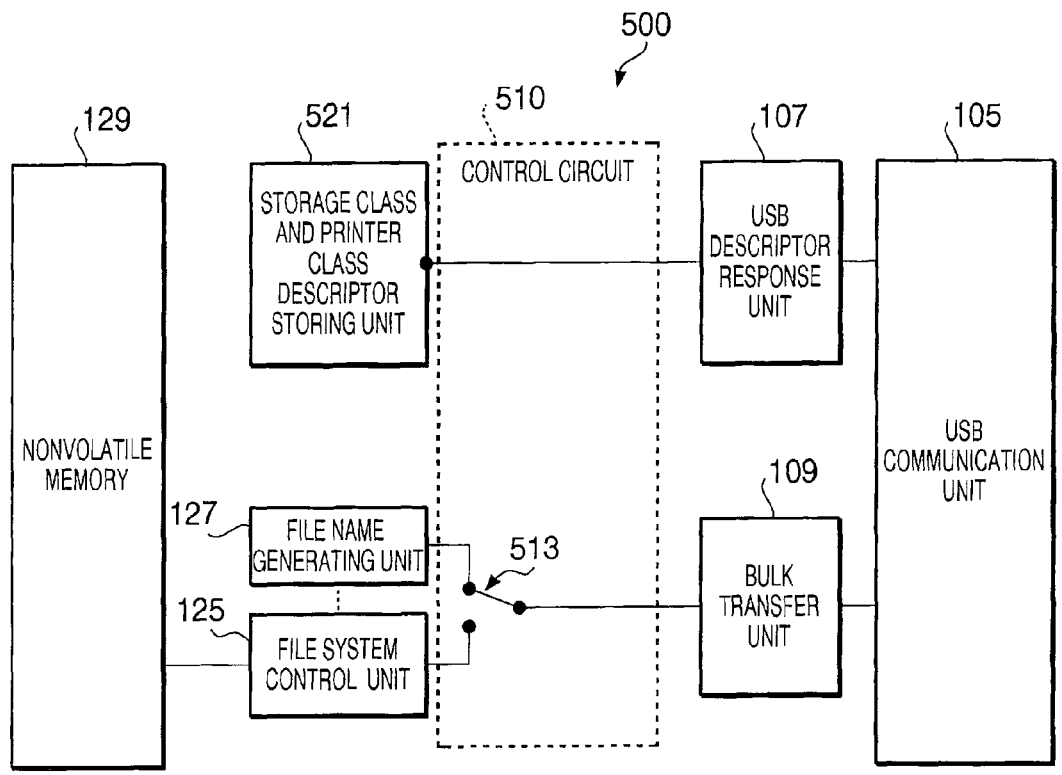
FIG. 7 is a schematic diagram showing a circuit configuration in a USB memory in a second embodiment in accordance with one or more aspects of the present invention.
FIG. 8 shows an example of assignment of endpoints in the USB memory in the second embodiment in accordance with one or more aspects of the present invention.

Next, FIG. 7 schematically shows a circuit configuration in a USB memory 500 in a second embodiment according to aspects of the invention. It is noted that some components of the USB memory 500 in FIG. 7 are configured in the same manner as the USB memory 100. Therefore, such components are indicated by the same reference numbers as shown in FIG. 3 and detailed explanations therefor will be omitted hereinafter for brevity.

As shown in FIG. 7, the USB memory 500 is provided with a storage-class-and-printer-class descriptor storing unit 521 instead of the printer class descriptor storing unit 121 and the storage class descriptor storing unit 123 in the USB memory 100. The storage-class-and-printer-class descriptor storing unit 521 stores a multi interface device descriptor including the storage class descriptor. When the multi interface device descriptor is transmitted to the PC 300, the PC 300 recognizes the USB memory 500 as a multi function device having a printer function and a storage function. According to the above configuration, the switch 103 can be removed from the USB memory 500 and the control circuit 510 is only provided with a contact point 513 having the same function as the contact point 113 in the USB memory 100.

In the USB memory 500 configured as above, end points are assigned as shown in FIG. 8. Specifically, "control transfer" is assigned to "endpoint 0", "bulk out" of the printer class of the interface 1 is assigned to "endpoint 1", "bulk out" of the storage class of the interface 2 is assigned to "endpoint 2" and "bulk in" of the storage class of the interface 2 is assigned to "endpoint 3."

Hereinafter, a process to be executed by the logic circuit including the control circuit 510 of the USB memory 500 in the second embodiment will be described with reference to FIG. 9. Explanations regarding the same steps in FIG. 9 as FIG. 3 in the first embodiment will be omitted and differences therebetween will be described below.

Figure 9:
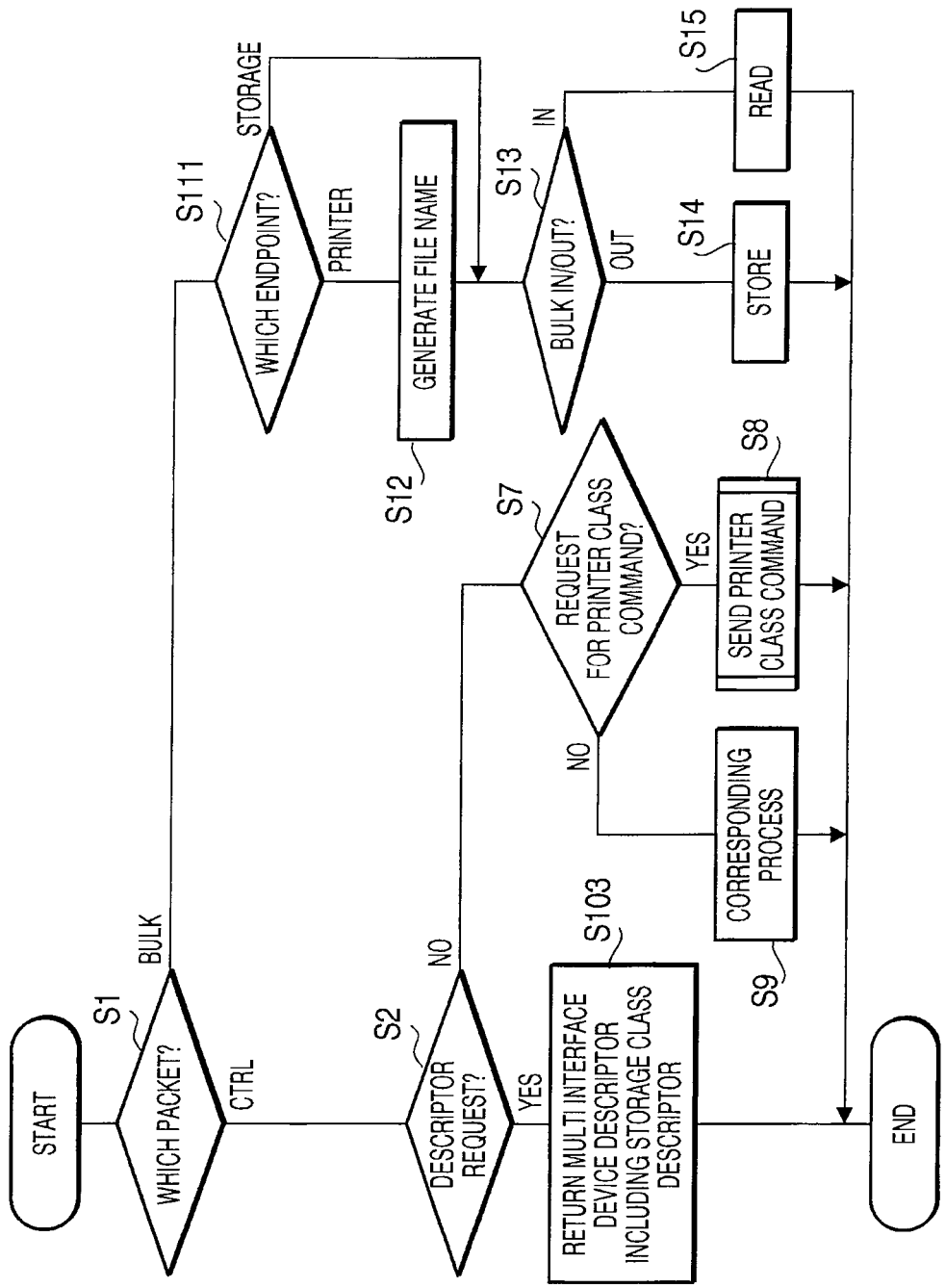
FIG. 9 is a flowchart illustrating a process to be executed in the USB memory in the second embodiment in accordance with one or more aspects of the present invention.

As shown in FIG. 9, when the packet received from the PC 300 includes the descriptor request (S2: YES), the multi interface device descriptor including the storage class descriptor that is stored in the storage-class-and-printer-class descriptor storing unit 521 is transmitted to the PC 300 (S103), and the process is terminated. With the above process, it is possible to make the PC 300 recognize a device connected to the connecting portion 316 (namely, the USB memory 500) as a multi function device having the printer function and storage function. Therefore, the print data generated by the printer driver of the PC 300 can be output to the USB memory 500 as described in the first embodiment.

Additionally, since the USB memory 500 is not provided with the switch 103, when the packet is for bulk transfer (S1: Bulk), it is judged which endpoint is designated by the PC 300 (S111). When an endpoint designated by the PC 300 is "1" which corresponds to the printer (S111: Printer), the unique file name is generated (S12) and the process goes to S13. When an endpoint designated by the PC 300 is "2" or "3" which corresponds to the storage (S111: Storage), the process goes to S13 without performing the step S12. That is, in the second embodiment, the contact point 513 is switched based on the endpoint designated by the PC 300 (see FIG. 7).

As described above, with the USB memory 500 according to the second embodiment, the same effects as the first embodiment are achieved. Additionally, since the multi interface device descriptor including the storage class descriptor that is stored in the storage-class-and-printer-class descriptor storing unit 521 is returned to the PC 300 in response to the descriptor request, the configuration of the USB memory 500 and the process to be executed in the USB memory 500 are more simplified.

Figure 10:
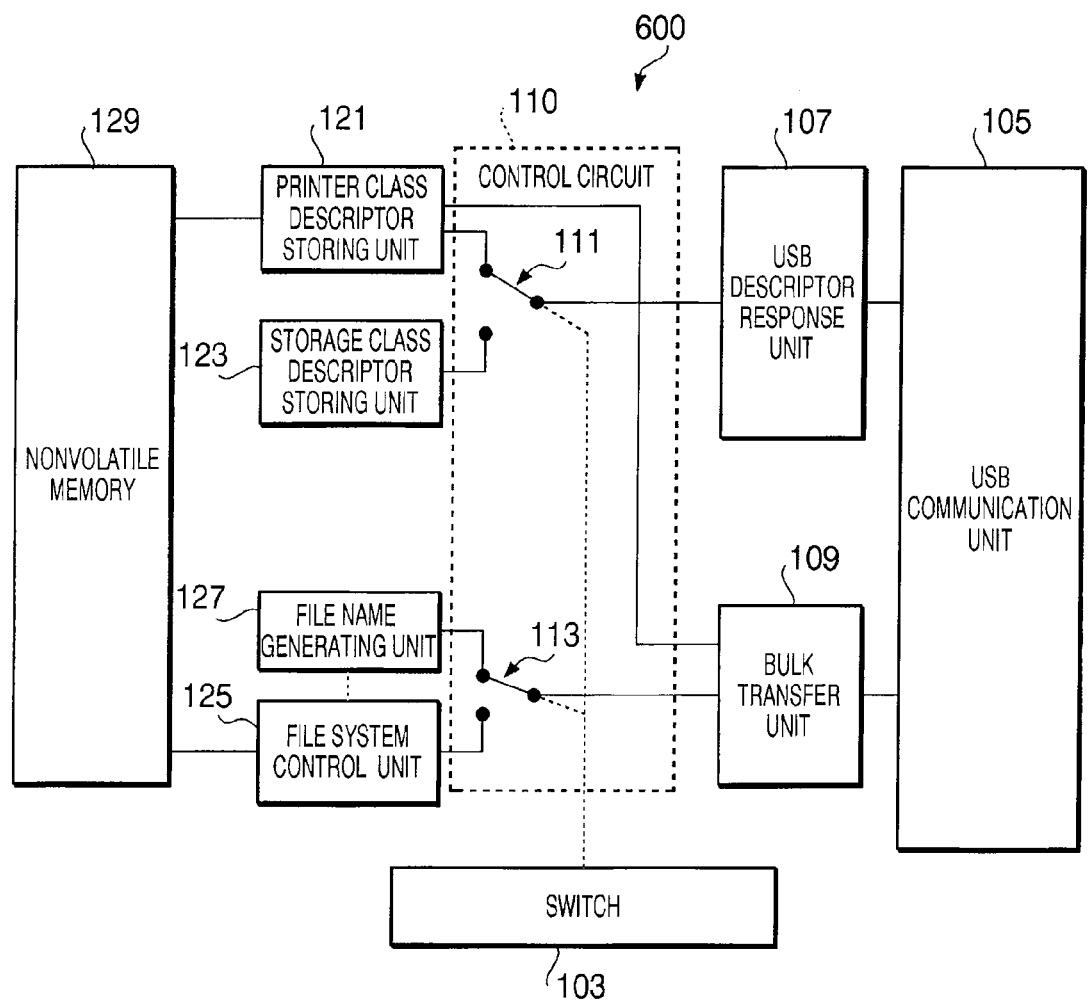
FIG. 10 is a schematic diagram showing a circuit configuration in a USB memory in a third embodiment in accordance with one or more aspects of the present invention.

Subsequently, FIG. 10 schematically shows a circuit configuration in a USB memory 600 in a third embodiment according to aspects of the invention. The USB memory 600 is different from the USB memory 100 in the following points. In the USB memory 600, the bulk transfer unit 109 is also connected to the printer class descriptor storing unit 121, and the printer class descriptor storing unit 121 is not connected to the nonvolatile memory 129. The other portions of the USB memory 600 are configured to be substantially the same as the USB memory 100. With the USB memory 600 configured as above, the printer class descriptor stored in the printer class descriptor storing unit 121 can be updated by bulk transfer. Therefore, when a new printer 1 is to be used, it is possible to make the PC 300 recognize the USB memory 600 as the new printer 1 by updating the printer class descriptor stored in the printer class descriptor storing unit 121 to a new printer class descriptor representing the new printer 1.

Hereinafter, an updating process to be executed by the PC 300 will be described with reference to a flowchart shown in FIG. 11. The updating process is executed in accordance with a program stored in the HDD 314 of the PC 300 and initiated when an execution instruction is issued on the OS of the PC 300.

Figure 11:
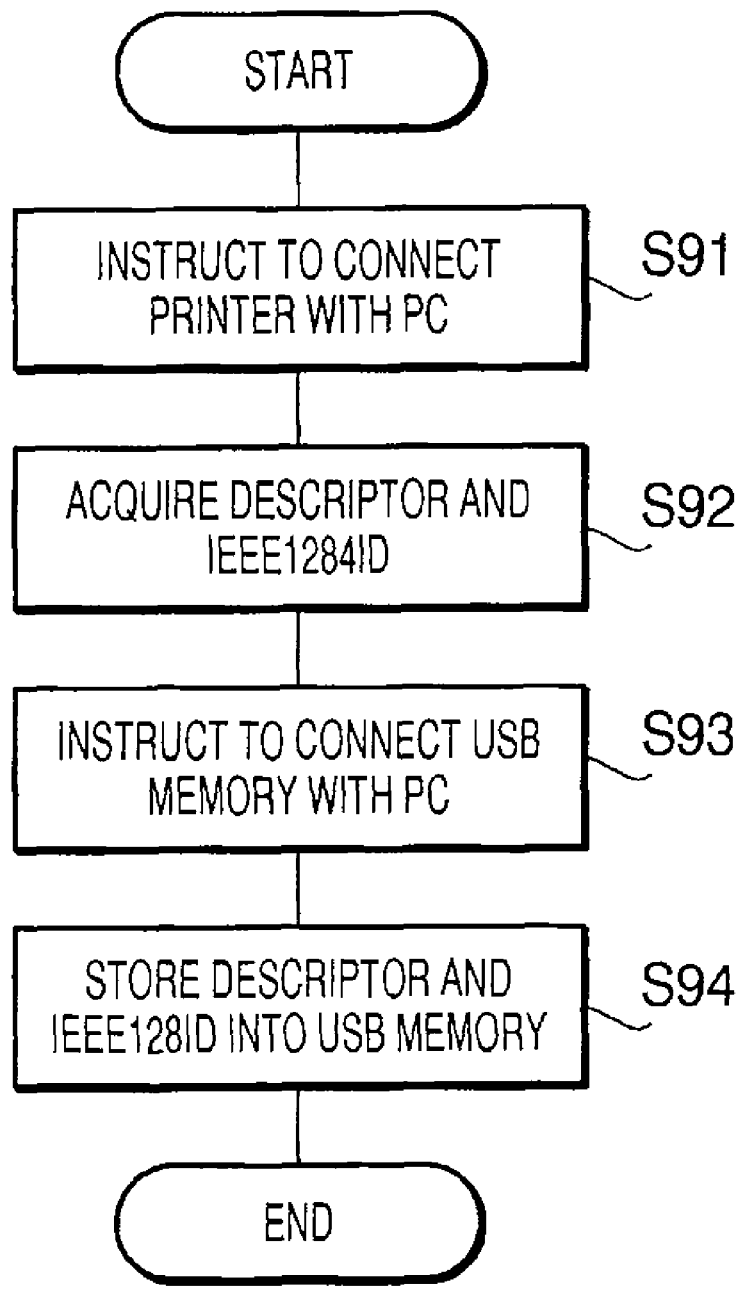
FIG. 11 is a flowchart illustrating an updating process to be executed by a PC connected to the USB memory in the third embodiment in accordance with one or more aspects of the present invention.

As shown in FIG. 11, in the updating process, firstly, a user is induced to connect the printer 1 with the PC 300 by an instruction message displayed on the display device 320 (S91). When the printer 1 is connected to the PC 300 by the user, the process goes to S92, in which there are obtained a descriptor representing the printer 1 and an IEEE1248ID of the printer 1 (S92). Then the user is induced to connect the USB memory 600 with the PC 300 by an instruction message displayed on the display device 320 (S93). When the USB memory 600 is connected to the PC 300 by the user, the obtained descriptor and the IEEE1248ID of the printer 1 are stored in the USB memory 600 (S94). By updating the descriptor and the IEEE1248ID as described above, it is possible to make the PC 300 acknowledge the USB memory 600 as the new printer 1.

Figure 12:
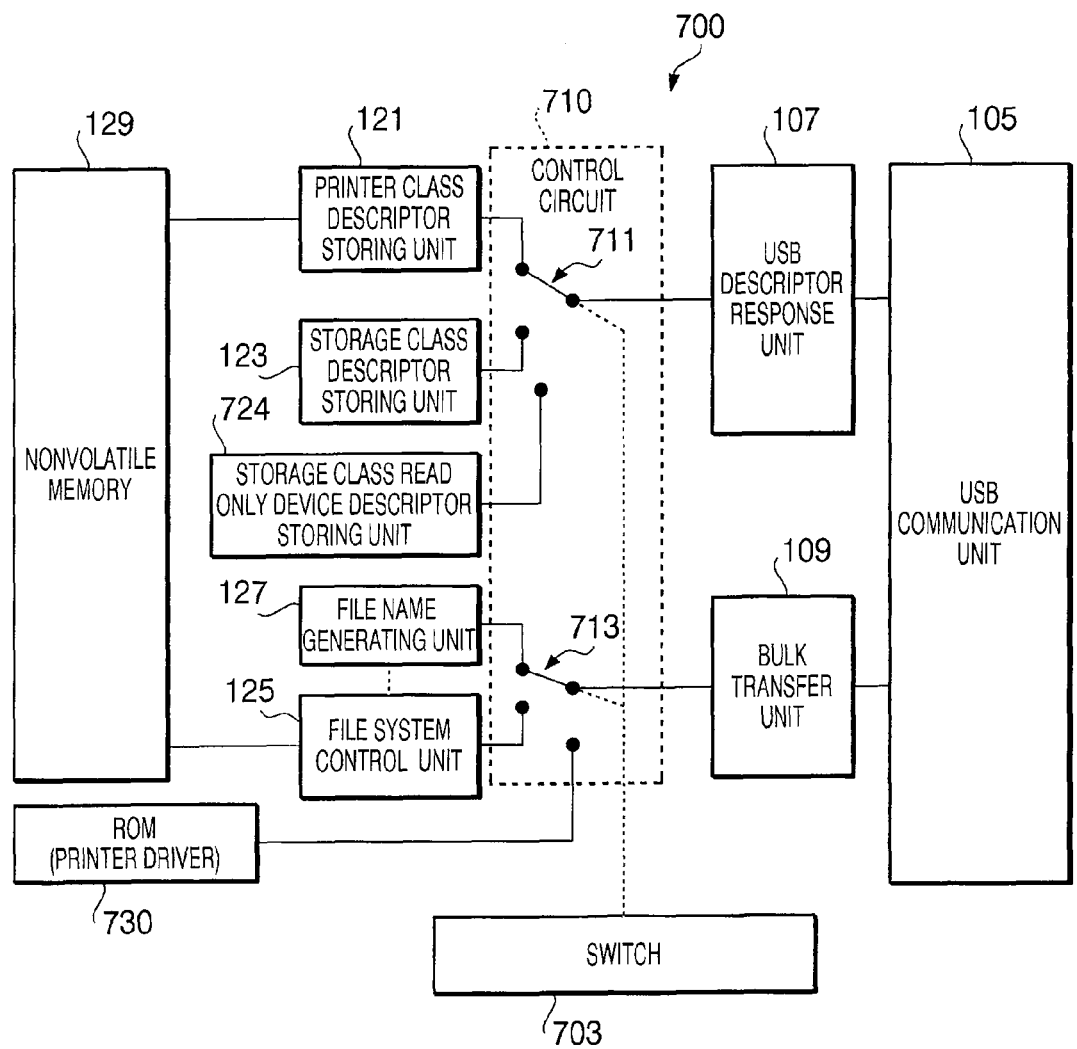
FIG. 12 is a schematic diagram showing a circuit configuration in a USB memory in a fourth embodiment in accordance with one or more aspects of the present invention.

Next, FIG. 12 is a schematic diagram showing a circuit configuration in the USB memory 700 in a fourth embodiment according to aspects of the invention. It is noted that some components of the USB memory 700 in FIG. 12 are configured in the same manner as the USB memory 100. Therefore, such components are indicated by the same reference numbers as shown in FIG. 3 and detailed explanations therefor will be omitted hereinafter for brevity.

As shown in FIG. 12, the USB memory 700 is provided with a switch 703 instead of the switch 103. The switch 703 is capable of selecting three positions. The USB memory 700 is further provided with a storage class read only device descriptor storing unit 724 for storing a storage class read only descriptor and a ROM 730 for storing a printer driver, in addition to the components provided in the USB memory 100. The printer driver stored in the ROM 730 is installed by an installer of an executable file format. The installer is set so as to be automatically launched when the USB memory 700 is connected to the PC 300. Additionally, a contact point 711 of a control circuit 710 selectively connects the USB descriptor response unit 107 with the printer class descriptor storing unit 121, storage class descriptor 123, or the storage class read only device descriptor storing unit 724. Further, a contact point 713 of a control circuit 710 selectively connects the bulk transfer unit 109 with the file name generating unit 127, the file system control unit 125, or the ROM 730.

In the USB memory 700 configured as above, endpoints are assigned as shown in FIGS. 13A, 13B and 13C depending on a state of the switch 703 (states of the contact points 711 and 713 controlled by the control circuit 710). Specifically, when the switch 103 is set to the printer side, "control transfer" and "bulk out" of the printer class of the interface 1 are assigned to the endpoint 0 and endpoint 1, respectively, as shown in FIG. 13A. When the switch 103 is set to the storage side, "control transfer", "bulk out" of "storage class" of the interface 2 and "bulk in" of the storage class of the interface 2 are assigned to the endpoint 0, endpoint 1 and endpoint 2, respectively, as shown in FIG. 13B. Further, when the switch 103 is set to a driver storage side, "control transfer" and "bulk in" of the storage class of an interface 3 are assigned to the endpoint 0 and endpoint 1, respectively, as shown in FIG. 13C.

Hereinafter, a process to be executed by the logic circuit including the control circuit 710 of the USB memory 700 in the fourth embodiment will be described with reference to FIG. 14. Explanations regarding steps shown in FIG. 14 which are similar to those shown in FIG. 5 in the first embodiment will be omitted and differences therebetween will be described hereinafter.

As shown in FIG. 14, in S203 as an alternative to the step S3, it is judged in which state the switch 703 is set among the printer side, storage side and the driver storage side (S203). When the switch is set to the printer side or the storage side, the same steps as described in FIG. 5 are performed. On the other hand, when the switch is set to the driver storage side (S203: Driver Storage), the storage class read only descriptor is transmitted to the PC 300 (S205) and the process is terminated. Similarly, in S211 as an alternative to the step S11, it is judged in which state the switch 703 is set among the printer side, storage side and the driver storage side (S211). When the switch is set to the printer side or the storage side, the same steps as described in FIG. 5 are performed. On the other hand, when the switch is set to the driver storage side (S211: Driver Storage), the printer driver is read out from the ROM 730 (S215) and then the process is terminated.

Thus, in the present embodiment, by switching the switch 703 to the driver storage side, the installer is automatically activated when the USB memory 700 is connected to the PC 300, and the printer driver stored in the ROM 730 is automatically installed in the PC 300. Then, even if a PC 300 in an outside location is not provided with a printer driver corresponding to a descriptor stored in the printer class descriptor storing unit 121, the print data can appropriately be stored in the USB memory 700 by installing the printer driver stored in the USB memory 700 as above.

Next, FIG. 15 is a schematic diagram showing a circuit configuration in the USB memory 800 in a fifth embodiment according to aspects of the invention. It is noted that the USB memory 800 is configured by applying the same modifications as applied to the USB memory 500 in the second embodiment to the USB memory 700 in the fourth embodiment.

Specifically, the USB memory 800 is provided with the aforementioned storage-class-and-printer-class descriptor storing unit 521, instead of the printer class descriptor storing unit 121, the storage class descriptor storing unit 123 and storage class read only device descriptor storing unit 724. Additionally, the USB memory 800 is not provided with the switch 703. Further, a control circuit 810 has only a contact point 813 configured to selectively connect the bulk transfer unit 109 directly with the file system control unit 125, indirectly with the file system control unit 125 via the file name generating unit 127, or with the ROM 730.

In the USB memory 800 configured as above, endpoints are assigned as shown in FIG. 16. Specifically, "control transfer" is assigned to the endpoint 0, "bulk out" of the printer class of the interface 1 is assigned to the endpoint 1, "bulk out" of the storage class of the interface 2 is assigned to the endpoint 2, "bulk in" of the storage class of the interface 2 is assigned to the endpoint 3, and "bulk in" of the storage class of the interface 3 are assigned to an endpoint 4.

As described in the fourth embodiment, the printer driver is stored in the ROM 730 and installed by plug and play. The printer driver includes a setting file (INF file) which is described so that the printer driver can be installed to conform to the printer class descriptor.

Therefore, when the USB memory 800 is connected to the PC 300, the PC 300 regards that both of the printer and the storage are concurrently connected therewith. Then, when the printer driver conforming to the printer which the USB memory 800 pretends to be is not installed, the corresponding printer driver is searched by a plug-and-play operation of the OS. Then, when the printer driver stored in the ROM 730 is found automatically or manually, the printer driver is automatically installed into the PC 300.

As described with reference to FIG. 17, the process to be executed by the logic circuit including the control circuit 810 in the USB memory 800 in the fifth embodiment is also configured by applying the same modifications as applied to the process shown in FIG. 9 in the second embodiment to the process shown in FIG. 14 in the fourth embodiment. Specifically, as shown in FIG. 17, when the packet includes the descriptor request (S2: YES), the multi interface device descriptor including the storage class descriptor stored in the storage-class-and-printer-class descriptor storing unit 521 is transmitted to the PC 300 (S103), and the process is terminated.

Additionally, since the USB memory 800 is not provided with the switch 103 or 703, when the packet is for bulk transfer (S1: Bulk), it is judged whether the endpoint 4 is designated in S311. When the endpoint 4 is designated (S311: YES), the printer driver is read out form the ROM 730 in the aforementioned step S215, and the process is terminated. On the other hand, when the endpoint 4 is not designated (S311: NO), it is judged whether the endpoint 1 of the printer class is designated (S312). When the endpoint 1 is designated (S312: YES), the steps S13-S15 are performed after executing the step S12 as described above. When the endpoint 2 or endpoint 3 of the storage class is designated (S312: NO), the steps S13-S15 are performed without executing the step S12 as described above.

Hence, the USB memory 800 in the present embodiment can bring the same effects as the aforementioned USB memory 700 with more simplified configuration and process than those of the USB memory 700.

Subsequently, FIG. 18 is a schematic diagram showing a circuit configuration in the USB memory 900 in a sixth embodiment according to aspects of the invention. The USB memory 900 is different from the USB memory 700 in the following points. The USB memory 900 includes a nonvolatile memory 831 for storing a printer name, and a RAM 832 that is provided between the ROM 730 and the contact point 713 and connected with the nonvolatile memory 831. The RAM 832 is also selectively connected to the bulk transfer unit via the contact point 713. The other portions of the USB memory 900 are configured in the same manner as the USB memory 700.

A process to be executed in the USB memory 900 is similar to the process to be executed in the USB memory 700 (see FIG. 14). However, the step S215 in FIG. 14 is different in the following points. FIG. 19 is a flowchart illustrating a detailed process of the step S215 to be executed in the USB memory 900. As shown in FIG. 19, when the step S215 is executed for reading out the printer driver from the ROM 730, firstly, it is judged whether to read the INF file (S2151). The INF file is described so that the printer driver stored in the ROM 730 can be installed to conform to the printer class descriptor, as described above. Further, the INF file includes a default name (registration name) of a printer driver to be generally installed. Then, when the INF file is to be read (S2151: YES), the INF file to be transmitted is generated on the RAM 832 by combining the printer driver stored in ROM 730 and the default name of the printer stored in the nonvolatile memory 831 (S2152). Then the generated INF file is transmitted to the PC 300 (S2153), and the process is terminated. On the other hand, when the INF file is not to be read (S2151: NO), the process goes to S2153, in which a file corresponding to the request is transmitted to the PC 300.

Hence, in the present embodiment, when the user wishes to give a uniform unique name to printers to be installed as network printers, the user can achieve it only by changing a part of the INF file. In this case, the INF file is configured such that only a part corresponding to the printer name is rewritable. Thereby, the INF file configured as above can reduce troubles caused due to a miswritten text therein, compared with an INF file configured such that an entire of the file can be rewritten.

Hereinabove, the embodiments according to aspects of the present invention have been described. However, various sorts of modifications may be applied to the embodiments as exemplified below. For example, when "bulk in" of the printer class is assigned to the endpoint 2 as shown in FIG. 20 in the USB memory 100 of the first embodiment, the process shown in FIG. 5 may be modified as follows. That is, steps, which are executed when the packet is for bulk transfer (S1: Bulk) and the switch 103 is set to the printer side (S11: Printer), may be modified as shown in FIG. 21. It is noted that, when the switch 103 is set to the storage side (S11: Storage), the same steps as shown in FIG. 5 are performed. Additionally, the aforementioned processes in the other embodiments can be modified in the same manner as described below.

In the process shown in FIG. 21, after the file name is generated as described above, when it is judged that the packet is for bulk out (S13: Out), PJL data included in the packet are analyzed (S141). Then, it is judged whether a command "USTATUS ON" representing a request for transmitting status information is included in the PJL data (S142). When the command "USTATUS ON" is included (S142: YES), the command "USTATUS ON" is changed to a command "USTATUS OFF" (S143) and a USTATUS flag is set ON (S144). Then the process goes to S14 to store the data transmitted from the PC 300. Even though the print data include the command "USTATUS ON," the printer 1 can not transmit the status information to the PC 300 when performing the direct printing. Therefore, the command "USTATUS ON" is changed to the command "USTATUS OFF" (S143).

On the other hand, when the command "USTATUS ON" is not included (S142: NO), the USTATUS flag is set OFF (S146). Then the process goes to S14 to store the data transmitted from the PC 300.

Meanwhile, when it is judged that the packet is for bulk in (S13: In), it is judged whether the USTATUS flag is set ON (S151). When the USATUS flag is set OFF (S151: NO), blank data are transmitted to the PC 300 (S152) and the process is terminated. On the other hand, when the USATUS flag is set ON (S151: YES), it is judged whether the request for bulk in included in the received packet is a first request (S153). When the request for bulk in included in the packet is the first request (S153: YES), storage information including a remaining capacity of the USB memory 100 is transmitted to the PC 300 as a USTATUS response (S154) and the process is terminated.

When the request for bulk in is not the first request (S153: NO), it is judged whether the storage information including the remaining capacity of the USB memory 100 has changed (S155). Then, when the storage information has not changed (S155: NO), the blank data are transmitted to the PC 300 (S152) and the process is terminated. On the other hand, when the storage information has changed (S155: YES), the storage information including the remaining capacity of the USB memory 100 is transmitted as a USTATUS response to the PC 300 (S156) and the process is terminated.

With the above configuration, data communication between the PC 300 and the USB memory 100 can be made more similar to data communication between the PC 300 and the printer 1. Additionally, by changing the command "USTATUS ON" to "UTATUS OFF", the direct printing can be performed more smoothly.

Next, FIG. 22 is a flowchart illustrating a status monitor process to be executed by the PC 300. The status monitor process is executed with the USTATUS information transmitted from the USB memory 100 in parallel with a process for the printer driver. As shown in FIG. 22, in the status monitor process, firstly, a status dialog showing a status of the printer 1 is displayed on the display device 320 as shown in FIG. 23A (S501). Next, the PJL data including the command "USTATUS ON" are transmitted to a device (the printer 1 or USB 100 recognized as the printer) connected to the connecting portion 316 (S502). Then, the USTATUS response is received from the device (S503).

It is noted that PJL data used for the USTATUS response are configured to be slightly different between a case where the device is the printer 1 and a case where the device is the USB memory 100 recognized as the printer. Therefore, it is judged in S504 whether the USTATUS response is PJL data representing a storage, that is, whether the USTATUS response is PJL data representing that the device is the USB memory 100 recognized as the printer.

When the USTATUS response is not PJL data representing a storage, that is, the USTATUS response is transmitted from the printer 1 (S504: NO), the process goes to S505, in which it is judged whether the printer 1 is disconnected (S505). When the printer 1 is not disconnected (S505: NO), the status of the printer 1 is displayed on the status dialog (S506) and the process goes back to S503. Thus, when the printer 1 is connected to the connecting portion 316, the steps of S503 to S506 are repeated, and the status of the printer 1 is displayed on the status dialog (S506). Then, when the printer 1 is disconnected (S505: YES), the process is terminated.

On the other hand, when the USTATUS response is PJL data representing a storage (S504: YES), the status dialog is erased from on the display device 320 (S511). Then, a remaining capacity dialog as shown in FIG. 23B that represents the remaining capacity of the USB memory 100 is displayed on the display device 320 (S512). Thereafter, it is judged whether the USB memory 100 is disconnected (S513). When the USB memory 100 is not disconnected (S513: NO), a new USTATUS response is received from the USB memory 100 (S514). Then, the remaining capacity dialog is updated in accordance with the new USTATUS response (S515). Then, the process goes back to S513.

Thus, when the USB memory 100 recognized as the printer is connected to the connecting portion 316, the steps of S513 to S515 are repeated, and the remaining capacity of the USB memory 100 is displayed on the remaining capacity dialog (S515). Then, when the USB memory 100 is disconnected (S513: YES), the process is terminated. In this way, when the status monitor process is performed in parallel with the process for the printer driver, the operability of the printer driver can be improved.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, a memory card, a CD-R, a CD-RW and a portable hard disk can be applied to the embodiments according to aspects of the invention as well as the USB memory.

Additionally, the print data stored in the USB memory are not limited to data described in the PJL/PDL format that are generated by a general printer driver as described in the above embodiments. For example, the USB memory may pretend to be a printer capable of direct printing based on a JPEG file generated by a digital camera. In this case, for example, the printer driver stored in the ROM 730 in the fifth and sixth embodiments may describe each page in a print job with a different JPEG file, instead of describing pages in the normal PJL/PDL format.

What is claimed is:

1. An apparatus connectable with an external device, comprising:
    a data communication unit configured to perform data communication with the external device;
    a data storing unit configured to store therein data received from the external device and/or data to be sent to the external device via the data communication unit;
    a first device information output unit configured to send first device information for making
    the external device recognize the apparatus as a storage, to the external device via the data communication unit;
    a second device information output unit configured to send second device information for making the external device recognize the apparatus as a printer, to the external device via the data communication unit;
    a contact point configured to selectively connect the data communication unit with one of the first device information output unit and the second device information output unit such that
        when the contact point connects the data communication unit with the first device information output unit, the first device information output unit is permitted to send the first device information to the external device via the data communication unit, and the second device information output unit is not permitted to send the second device information to the external device via the data communication unit, and
        when the contact point connects the data communication unit with the second device information output unit, the first device information output unit is not permitted to send the first device information to the external device via the data communication unit, and the second device information output unit is permitted to send the second device information to the external device via the data communication unit;
    a status checking unit configured to check a remaining capacity of the data storing unit when the data communication unit receives a status signal for inquiring as to a status of the printer that is transmitted by the external device in response to the second device information; and
    an error signal output unit configured to send an error signal representing a status "out of paper" to the external device via the data communication unit when the status checking unit judges that the remaining capacity of the data storing unit is insufficient,
    wherein, when the data communication unit receives print data for the printer that is transmitted by the external device in cases where the second device information is sent by the second device information output unit, the data storing unit stores the print data in a state readable externally via the data communication unit.

2. The apparatus according to claim 1, further comprising a connecting portion connectable with a general-purpose connecting port provided to the external device,
    wherein the data communication unit is configured to perform data communication with the external device via the connecting portion.

3. The apparatus according to claim 1, wherein the apparatus is a USB memory.

4. The apparatus according to claim 3, wherein each of the first device information and the second device information includes a USB descriptor.

5. The apparatus according to claim 1, further comprising:
    a switch configured to be switchable between a storage state and a printer state; and
    a control unit configured to control the contact point to connect the data communication unit with the first device information output unit in cases where the switch is set in the storage state and with the second device information output unit in cases where the switch is set in the printer state.

6. The apparatus according to claim 5, wherein the switch is configured to be externally switchable between the storage state and the printer state.

7. The apparatus according to claim 1,
    wherein the first device information is configured to provide a first signal representing a storage class, and
    wherein the second device information is configured to provide a second signal representing a printer class.

8. The apparatus according to claim 7, wherein the second device information output unit is configured to change the printer class represented by the second signal.

9. The apparatus according to claim 1, further comprising a data deleting unit configured to delete the print data stored in the data storing unit when the data communication unit receives a reset signal for interrupting a printing operation that is transmitted by the external device in response to the second device information.

10. The apparatus according to claim 1, further comprising a file name generating unit configured to give a file name to print data to be stored in the data storing unit.

11. The apparatus according to claim 1, wherein, when the data communication unit receives the print data for the printer from the external device in cases where the second device information is sent by the second device information output unit, the data storing unit stores the print data as a file readable externally via the data communication unit.

12. The apparatus according to claim 1, wherein the second device information includes disguise information for making the external device misunderstand the apparatus as a printer.

13. An apparatus connectable with an external device, comprising:
    a processor;
    a data communication unit configured to perform data communication with the external device;
    a data storing unit configured to store therein data received from the external device and/or data to be sent to the external device via the data communication unit;
    memory storing computer-readable instructions that, when executed, cause the processor to provide:

a device information output unit configured to send device information to the external device via the data communication unit, the device information including first device information for making the external device recognize the apparatus as a storage and second device information for making the external device recognize the apparatus as a printer, a control unit configured to:
- check a remaining capacity of the data storing unit when the data communication unit receives a status signal inquiring as to a status of the printer that is transmitted by the external device in response to the second device information,
- send an error signal representing a status "out of paper" to the external device via the data communication unit upon judging that the remaining capacity of the data storing unit is insufficient,
- determine whether a data packet received via the data communication unit from the external unit is a packet for bulk transfer, and
- determine whether the received data packet corresponds to a printer when the received data packet is determined to be a packet for bulk transfer;

a file name generating unit configured to determine whether the received data packet is for bulk in transfer or bulk out transfer when the received data packet is determined to correspond to a printer, wherein when the file system control unit determines that the received data packet is for bulk out transfer, the data storing unit stores data in the received data packet in association with the generated file name, wherein when the file system control unit determines that the received data packet is for bulk in transfer, the data communication unit sends data to the external device read from the data storing unit in association with the generated file name, and wherein, when the data communication unit receives print data for the printer that is transmitted by the external device when the device information is sent by the device information output unit, the data storing unit stores the print data in a state readable externally via the data communication unit.

14. The apparatus according to claim 13, wherein the file system control unit is further configured to determine whether the received data packet is for bulk in transfer or bulk out transfer when the received data packet is not determined to correspond to a printer.

15. The apparatus according to claim 13, wherein the file name generating unit is further configured to not generate a file name when the received data packet is determined not to correspond to a printer.

* * * * *